(12) United States Patent
Julian et al.

(10) Patent No.: US 12,674,813 B2
(45) Date of Patent: Jul. 7, 2026

(54) SYSTEM FOR COMPENSATING FOR AN OUTPUT LATENCY IN A SPEED SENSOR

(71) Applicant: Allegro MicroSystems, LLC, Manchester, NH (US)

(72) Inventors: Pedro Julian, Bahía Blanca (AR); Alfredo A. Falcón, Bahía Blanca (AR)

(73) Assignee: Allegro MicroSystems, LLC, Manchester, NH (US)

( * ) Notice: Subject to any disclaimer, the term of this patent is extended or adjusted under 35 U.S.C. 154(b) by 169 days.

(21) Appl. No.: 18/753,102

(22) Filed: Jun. 25, 2024

(65) Prior Publication Data

US 2025/0389747 A1 Dec. 25, 2025

(51) Int. Cl.
 *G01P 3/489* (2006.01)
 *G01P 3/487* (2006.01)

(52) U.S. Cl.
 CPC .............. *G01P 3/489* (2013.01); *G01P 3/487* (2013.01)

(58) Field of Classification Search
 CPC ......... G01P 3/487; G01P 13/045; G01P 3/488
 See application file for complete search history.

(56) References Cited

U.S. PATENT DOCUMENTS

| | | | | |
|---|---|---|---|---|
| 5,742,568 | A * | 4/1998 | Nakano | ................. G11B 7/0901 |
| 8,729,890 | B2 | 5/2014 | Donovan et al. | |
| 8,729,892 | B2 | 5/2014 | Friedrich | |
| 8,793,085 | B2 | 7/2014 | Donovan et al. | |
| 9,285,438 | B2 | 3/2016 | Donovan et al. | |
| 9,605,975 | B2 | 3/2017 | Foletto et al. | |
| 10,636,285 | B2 | 4/2020 | Haas et al. | |
| 10,866,118 | B2 | 12/2020 | Foletto et al. | |
| 11,073,577 | B2 | 7/2021 | Romero et al. | |
| 11,333,486 | B2 | 5/2022 | Rigoni et al. | |
| 11,473,935 | B1 | 10/2022 | Diaconu et al. | |
| 11,555,716 | B1 * | 1/2023 | Rigoni | ................... G01D 5/204 |
| 11,703,314 | B2 | 7/2023 | Rigoni et al. | |
| 2015/0022188 | A1 * | 1/2015 | Daubert | ................... G01B 7/30 |
| | | | | 324/207.12 |
| 2016/0363638 | A1 * | 12/2016 | Daubert | ................ G01D 5/145 |
| 2019/0353677 | A1 * | 11/2019 | Lim | ...................... G01P 13/045 |
| 2019/0383885 | A1 * | 12/2019 | Sitorus | ................... G01R 33/09 |
| 2022/0390257 | A1 | 12/2022 | Deligiannis et al. | |

OTHER PUBLICATIONS

U.S. Appl. No. 18/748,234, filed Jun. 20, 2024, Pavlov et al.

* cited by examiner

*Primary Examiner* — Huy Q Phan
*Assistant Examiner* — Temilade S Rhodes-Vivour
(74) *Attorney, Agent, or Firm* — DALY, CROWLEY, MOFFORD & DURKEE, LLP

(57) ABSTRACT

A speed sensor device includes sensing elements to sense an angle of a moving target and to generate sine and cosine signals in response thereto; a signal condition circuit to process the sine and cosine signals, the processed sine and cosine signals having a phase lag introduced by the signal condition circuit; and a phase lead filter to receive the processed sine and cosine signals and to reduce the phase lag in the processed sine and cosine signals.

17 Claims, 19 Drawing Sheets

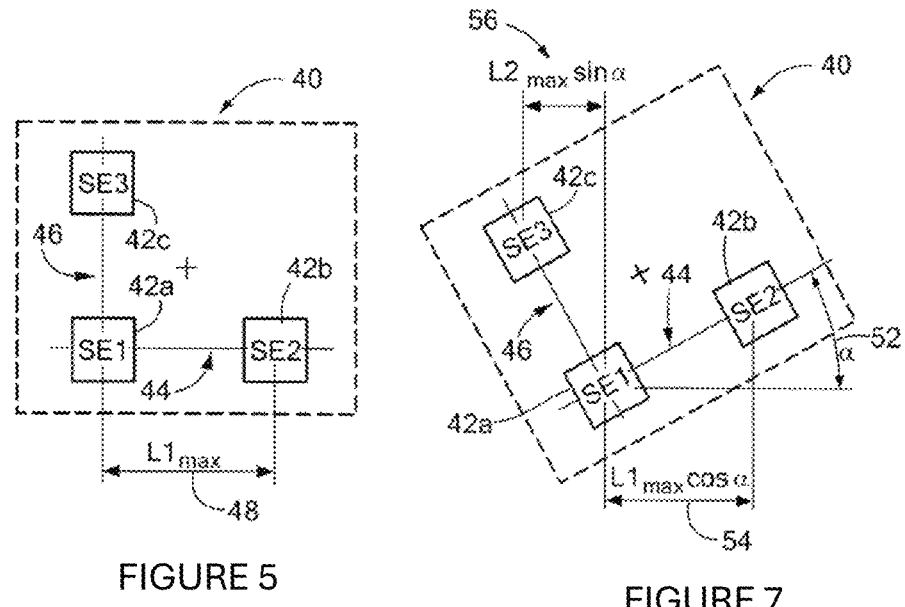
FIGURE 5
FIGURE 7
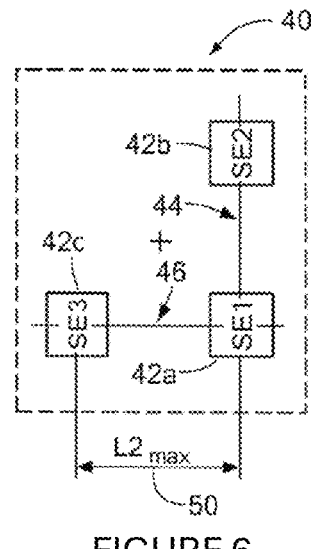
FIGURE 6

SYSTEM FOR COMPENSATING FOR AN OUTPUT LATENCY IN A SPEED SENSOR

BACKGROUND

Magnetic field sensors that sense the rotational motion of a target are known. The target can be a magnetic or ferrous target. Such sensors detect the features of the rotating target's profile, for example, teeth/valleys of a ferrous gear target or north/south poles of a magnetic target such as a ring magnet.

The magnetic field associated with the target profile is sensed by a magnetic field sensing element, such as Hall element or magnetoresistive (MR) element. As the target passes the sensing element, the magnetic field experienced by the sensing element varies in relation to the target profile. The sensing element provides a signal proportional to the sensed magnetic field. The sensor processes the magnetic field signal to generate an output, for example, a signal that changes state each time the magnetic field signal crosses a threshold. Such an output can be used to provide rotational speed information. A second sensing element can be employed to generate an output for rotational direction detection as well.

Some sensors, referred to as differential sensors, contain two sensing elements configured in a differential arrangement. In differential magnetic field sensors, the difference between the signals provided by the two sensing elements is used to generate a differential magnetic field signal indicative of transitions in the target's features. Differential sensing elements are effective in cancelling stray magnetic fields.

Differential magnetic field sensors may be orientation dependent with respect to the target. Thus, when a differential magnetic field sensor is used to measure the speed (or direction) of a rotating target, the pair of sensing elements should be centered over the target's profile for optimum performance.

Misalignment of the sensing elements relative to the target profile results in a reduction of the peak-to-peak differential signal. Consequently, applications that cannot control the sensor-to-target alignment usually employ a non-differential sensing type sensor.

SUMMARY

Example embodiments of the disclosure provide methods and apparatus for a sensor that processes sine and cosine signals, which introduces a phase lag, and includes a phase lead filter to reduce the phase lag in the processed sine and cosine signals.

According to an aspect of the disclosure, a speed sensor device includes sensing elements to sense an angle of a moving target and to generate sine and cosine signals in response thereto; a signal condition circuit to process the sine and cosine signals, the processed sine and cosine signals having a phase lag introduced by the signal condition circuit; and a phase lead filter to receive the processed sine and cosine signals and to reduce the phase lag in the processed sine and cosine signals. In an embodiment, the phase lead filter reduces the phase lag in the processed sine and cosine signals at frequencies greater than a first threshold frequency, the first threshold frequency corresponding to a lowest speed of the moving target. In a further embodiment, the phase lead filter reduces the phase lag in the processed sine and cosine signals at frequencies less than a second threshold frequency corresponding to a highest speed of the moving target.

In another embodiment, the phase lead filter reduces the phase lag in the processed sine and cosine signals at frequencies less than a second threshold frequency corresponding to a highest speed of the moving target and greater than a first threshold frequency corresponding to a lowest speed of the moving target. Additionally, the phase lead filter reduces the phase lag in the processed sine and cosine signals only at frequencies between a first threshold frequency corresponding to a lowest speed of the moving target and a second threshold frequency corresponding to a highest speed of the moving target.

In an additional embodiment, the phase lead filter reduces the phase lag in the processed sine and cosine signals at frequencies less than or equal to a second threshold frequency corresponding to a highest speed of the moving target and greater than or equal to a first threshold frequency corresponding to a lowest speed of the moving target. The signal condition circuit includes amplifiers. The phase lead filter consists of a zero followed by a pole.

The sensing elements comprise magnetic field sensing elements to sense the angle of the moving target. The signal condition circuit and the phase lead filter can be located on a single IC package. The phase lead filter can also be outside the IC package; i.e., the phase lead filter and signal condition circuit are not co-located on a single IC package.

In embodiments, the phase lead filter is defined in the analog domain by H(s)=(S+Z0)/(S+P0).

The phase lead filter can also be defined in a digital domain by replacing s with a bilinear transform function of z to realize:

$$H_2(s) = \frac{1 + \dfrac{k_0\left(1 - z^{-1}\right)}{1 + z^{-1}}}{1 + \dfrac{k_p\left(1 - z^{-1}\right)}{1 + z^{-1}}} = \frac{\dfrac{1 + z^{-1} + k_0\left(1 - z^{-1}\right)}{1 + z^{-1}}}{\dfrac{1 + z^{-1} + k_p\left(1 - z^{-1}\right)}{1 + z^{-1}}} = \frac{(1 + k_0) + z^{-1}(1 - k_0)}{(1 + k_p) + z^{-1}(1 - k_p)}$$

wherein $z^{-1}$ is a unit delay, $T_S$ is a sampling time, $$k_0 = \frac{2}{z_0 T_S} \text{ and } k_p = \frac{2}{p_0 T_S}.$$

In another embodiment, a method generates a sine signal and a cosine signal corresponding to a sensed angle of a moving target; processes the sine and cosine signals, the processed sine and cosine signals having a phase lag introduced by the processing thereof; and introduces a phase lead to the processed sine and cosine signals to reduce the phase lag in the processed sine and cosine signals. In an embodiment, the phase lag is reduced in the processed sine and cosine signals at frequencies greater than a first threshold frequency, the first threshold frequency corresponding to a lowest speed of the moving target. In a further embodiment, the phase lag is reduced in the processed sine and cosine signals at frequencies less than a second threshold frequency, the second threshold frequency corresponding to a highest speed of the moving target.

In another embodiment, the phase lag is reduced in the processed sine and cosine signals at frequencies less than a second threshold frequency corresponding to a highest speed of the moving target and greater than a first threshold frequency corresponding to a lowest speed of the moving target. Additionally, the phase lag is reduced in the processed sine and cosine signals only at frequencies between a first threshold frequency corresponding to a lowest speed of the moving target and a second threshold frequency corresponding to a highest speed of the moving target.

In an additional embodiment, the phase lag is reduced in the processed sine and cosine signals at frequencies less than or equal to a second threshold frequency corresponding to a highest speed of the moving target and greater than or equal to a first threshold frequency corresponding to a lowest speed of the moving target. The phase lag is reduced in the processed sine and cosine signals using a phase lead filter having a zero followed by a pole.

the phase lead filter can be defined in an analog domain by $H(S)=(1+S/Z0)/(1+S/P0)$. The phase lead filter can be defined in a digital domain by:

$$H_2(s) = \frac{1 + \dfrac{k_0\left(1-z^{-1}\right)}{1+z^{-1}}}{1 + \dfrac{k_p\left(1-z^{-1}\right)}{1+z^{-1}}} = \frac{\dfrac{1 + z^{-1} + k_0\left(1-z^{-1}\right)}{1+z^{-1}}}{\dfrac{1 + z^{-1} + k_p\left(1-z^{-1}\right)}{1+z^{-1}}} = \frac{(1+k_0) + z^{-1}(1-k_0)}{(1+k_p) + z^{-1}(1-k_p)}$$

wherein $z^{-1}$ is a unit delay, $T_S$ is a sampling time, $$k_0 = \frac{2}{z_0 T_S} \text{ and } k_p = \frac{2}{p_0 T_S}.$$

The sine signal and the cosine signal corresponding to the angle of the rotating target are generated by magnetic field sensing elements sensing a rotating target.

BRIEF DESCRIPTION OF THE DRAWINGS

The drawings are only for purposes of illustrating various embodiments and are not to be construed as limiting, wherein:

FIGS. 5 through 11 illustrate examples of magnetic field sensing structure configured for differential sensing;

DETAILED DESCRIPTION OF THE DRAWINGS

The features and other details of the disclosure will now be more particularly described. It will be understood that any specific embodiments described herein are shown by way of illustration and not as limitations of the concepts, systems, and techniques described herein. Features of this disclosure can be employed in various embodiments without departing from the scope of the concepts sought to be protected.

Figure 1:
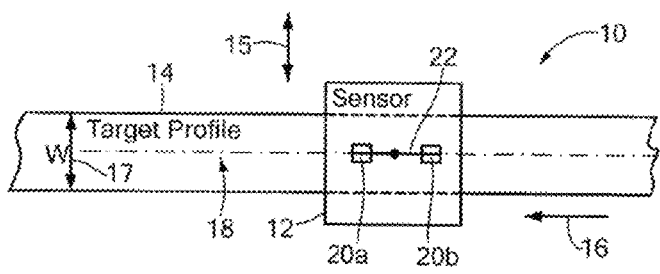
FIGS. 1 and 2 illustrate a sensing arrangement in which a rotary motion detecting magnetic field sensor and target profile of rotation.
Figure 2:
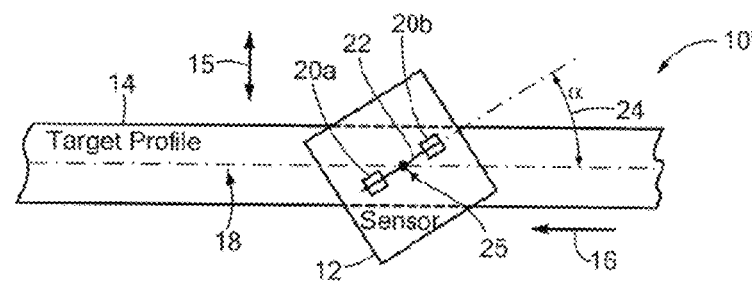

FIGS. 1 and 2 illustrate a sensing arrangement in which a rotary motion detecting magnetic field sensor and target profile of rotation are shown. Referring to FIG. 1, a sensing arrangement 10 in which a magnetic field sensor 12 is arranged in a radial sensing position relative to a rotating target profile 14 is shown. An axis of rotation is indicated by arrow 15. A direction of motion of the rotating target profile 14 is indicated by arrow 16. Although shown in one direction, the motion could be in the opposite direction or both directions.

The target profile 14, which has a width "W" 17, faces the "front" of the magnetic field sensor 12. The mid-point of the face width is indicated by a centerline 18 and referred to herein as the target profile's reference axis. The magnetic field sensor 12 is a differential sensing device and, as such, includes two sensing elements 20a and 20b for generating a differential signal responsive to change in magnetic field strength at a location relative to the target profile 14. That location corresponds to a differential channel (not shown). Associated with the differential channel is a sensing axis 22 as defined by the arrangement of the sensing elements 20a, 20b.

In the illustration of FIG. 1, the magnetic field sensor 12 is centered over the target profile 14 so that the sensing axis 22 is positioned approximately parallel to the target profile edges and aligned with the reference axis 18. The sensing axis 22 need not be exactly centered over the centerline 18 (as it is depicted) to be considered "aligned". That is, the sensing axis 22 may be somewhat offset from but parallel to the centerline 18. The width W must be large enough so that positioning of the sensing elements 20a, 20b is not too close to the target profile's edge, however, because of flux distortions in those areas.

The differential mode of operation requires careful adjustment of the sensor 12 to achieve that alignment. In some applications, the sensor alignment to the target cannot be guaranteed. Typically, sensor-target orientation offset or misalignment occurs at installation time, that is, when the sensor is installed near the target.

For example, the sensor may be mounted in a threaded housing that is screwed into an installation location and the installation process may be controlled by monitoring only the torque. Alternatively, the sensor or the housing in which it is contained may be mounted to a surface at the installation location in a way that results in misalignment between sensor and target profile.

An example of a differential magnetic field sensor structure is disclosed in U.S. Pat. No. 8,729,892. The entire content of U.S. Pat. No. 8,729,892 is hereby incorporated by reference.

FIG. 2 shows such misalignment with a sensing arrangement 10'. The sensing arrangement 10' is the same as sensing arrangement 10 of FIG. 1 except that the orientation of the magnetic field sensor 12 is offset relative to the target profile 14 by an orientation angle $\alpha$ 24. In other words, the sensing axis 22 is no longer aligned with the reference axis 18 but is instead offset relative to the reference axis 18 by the orientation angle $\alpha$ 24.

In this illustration, a mounting axis 25 about which sensor movement or other positioning offset can occur, for example, during installation, is centered equidistant of the two sensing elements 20a, 20b along the axis 22. The sensor misalignment causes degradation in sensor performance, as the peak-to-peak amplitude of the differential signal generated by the sensor 12 will not be at a maximum value.

From an application standpoint, the consequence of reduced differential signal peak-to-peak amplitude is the reduction of maximum air gap range.

Figure 3:
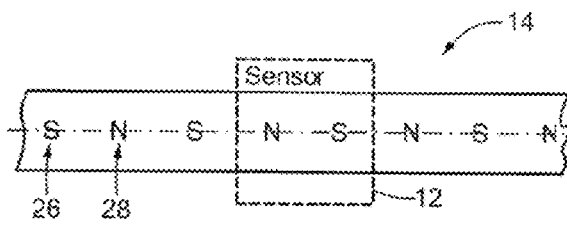
FIGS. 3 and 4 illustrate target profile defined by poles and alternating gear wheel teeth/valleys.
Figure 4:
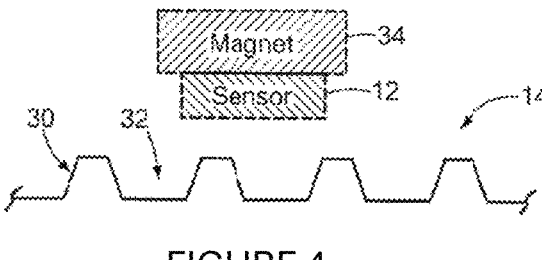

FIGS. 3 and 4 illustrate target profile defined by poles and alternating gear wheel teeth/valleys. As illustrated in FIG. 3, which shows the same "face" view of the target profile shown in FIGS. 1 and 2, the target profile 14 from FIG. 1 is defined by an alternating sequence of south and north magnetic poles 26 and 28, respectively.

As illustrated in FIG. 4, the target profile 14 (shown here in a side view to more clearly illustrate the features of the target profile) is defined by an alternating pattern of a raised feature (e.g., a tooth) 30 followed by a gap 32, typically referred to as a valley or recess. The teeth or other type of raised features can have various shapes, e.g., square, triangle or other, based on design requirements.

These patterns in FIGS. 3 and 4 may be provided along the circumference of the rotating target, e.g., a permanent magnet such as a ring magnet, or some other type of multi-pole magnet, or ferrous object such as a toothed gear wheel, either radially (i.e., along the outer rim or edge of the wheel or ring magnet) as shown in FIGS. 1 and 2, or axially (not shown). In an axial sensing arrangement with a ring magnet, the target profile of alternating poles would be defined on a broad surface of the ring magnet instead.

A differential sensor such as sensor 12 detects motion of rotating ferrous and magnetic targets by measuring the differential flux density of the magnetic field. Referring back to FIG. 4, to detect ferrous targets the magnetic field must be provided by a back biasing permanent magnet 34, e.g., the south or north pole of the magnet 34 may be attached to (or positioned near) the "back" of the sensor 12, i.e., the side that does not face the target profile 14, as shown. Misalignment of the type depicted in FIG. 2 can be prevented, but only with labor-intensive monitoring or specially designed assemblies.

FIGS. 5 through 11 illustrate examples of magnetic field sensing structure configured for differential sensing. More specifically, FIGS. 5-11 show arrangements that utilize multiple magnetic field sensing elements (or, simply, "sensing elements") to realize multiple differential channels. With these arrangements a differential sensor that is orientation independent (relative to the target profile) can be achieved, as will be discussed in further detail below.

In one exemplary embodiment, and referring to FIGS. 5-10, an arrangement based on the use of three sensing elements is shown. As shown in FIGS. 5-10, a magnetic field sensing structure 40 has a configuration of three sensing elements 42a, 42b, 42c (also labeled "SE1", "SE2", and SE3", respectively) for use in a differential magnetic field sensor.

The sensing elements 42a, 42b, 42c are spaced apart by some fixed distance. The physical placement of the sensing elements 42a, 42b, 42c near a target allows the sensing elements to be used to generate multiple differential signals responsive to change in magnetic field strength at respective locations relative to that target's profile (like target profile 14 of FIGS. 1, 3, and 4).

Referring to FIGS. 5-7, a first sensing axis 44 is defined by the arrangement of the sensing elements 42a, 42b (or first pair of differential sensing elements) and a second sensing axis 46 is defined by the arrangement of the sensing elements 42a, 42c (or second pair of differential sensing elements).

Thus, in the illustrated example, the three sensing elements are spatially arranged, for example, on the surface of a sensor die (the outline of which is indicated by dashed lines), to define the two sensing axes, that is, the first sensing axis 44 and the second sensing axis 46.

The sensing elements are arranged so that the two sensing axes 44, 46 are not aligned with each other in the plane of the die surface. Preferably, they are at an angle of about 90 degrees relative to each other. It will be understood, however, that a different angle could be used.

In the arrangement shown in FIGS. 5-7, the first and second pairs of differential sensing elements share the sensing element 42a. The element-to-element spacing of the sensing elements in each pair is preferably the same (or approximately the same), but could be different.

Referring now to FIG. 5, when the first sensing axis 44 is aligned with a target profile (that is, and referring back to FIG. 1, it aligns with the target profile's reference axis 18), a differential signal generated by the first sensing element pair 42a, 42b will have an amplitude that is maximal and a differential signal generated by the second sensing element pair 42a, 42c will have an amplitude that is zero. The distance "L1" between the sensing elements SE1 and SE2 along the reference axis is maximal (indicated as "$L1_{max}$" 48) for this orientation. The distance "L2" between the sensing elements SE1 and SE2 along the reference axis is zero.

Referring to FIG. 6, when the first sensing axis 44 is positioned at a 90° angle relative to the target profile's reference axis, the signal amplitude for the first differential signal will be zero, and signal amplitude for the second differential signal will be maximal. For the 90° shift in orientation, the distance "L2" between the sensing elements SE1 and SE3 along the reference axis is maximal (indicated as "$L2_{max}$" 50) and the distance "L1" is now zero.

Referring to FIG. 7, for a random orientation angle $\alpha$ 52 between the first sensing axis 44 and the target profile's reference axis, the signal amplitudes for the first differential signal, and the second differential signal will vary with the orientation angle For the depicted orientation, the distance L1 is equal to $L1_{max}$*cos α (indicated by reference numeral 54), and the distance L2 is equal to $L2._{max}$*sin α (indicated by reference numeral 56. A single differential signal whose amplitude is independent of the orientation angle α, and referred to herein as an orientation angle independent differential signal.

The term "orientation angle independent differential signal", as it is used herein, means that the amplitude of this single differential signal is completely or relatively independent of change in orientation angle. By "relatively orientation angle independent," it is meant that a residual change in amplitude with orientation angle can exist but is limited.

Figures 8, 9, 10, 11:
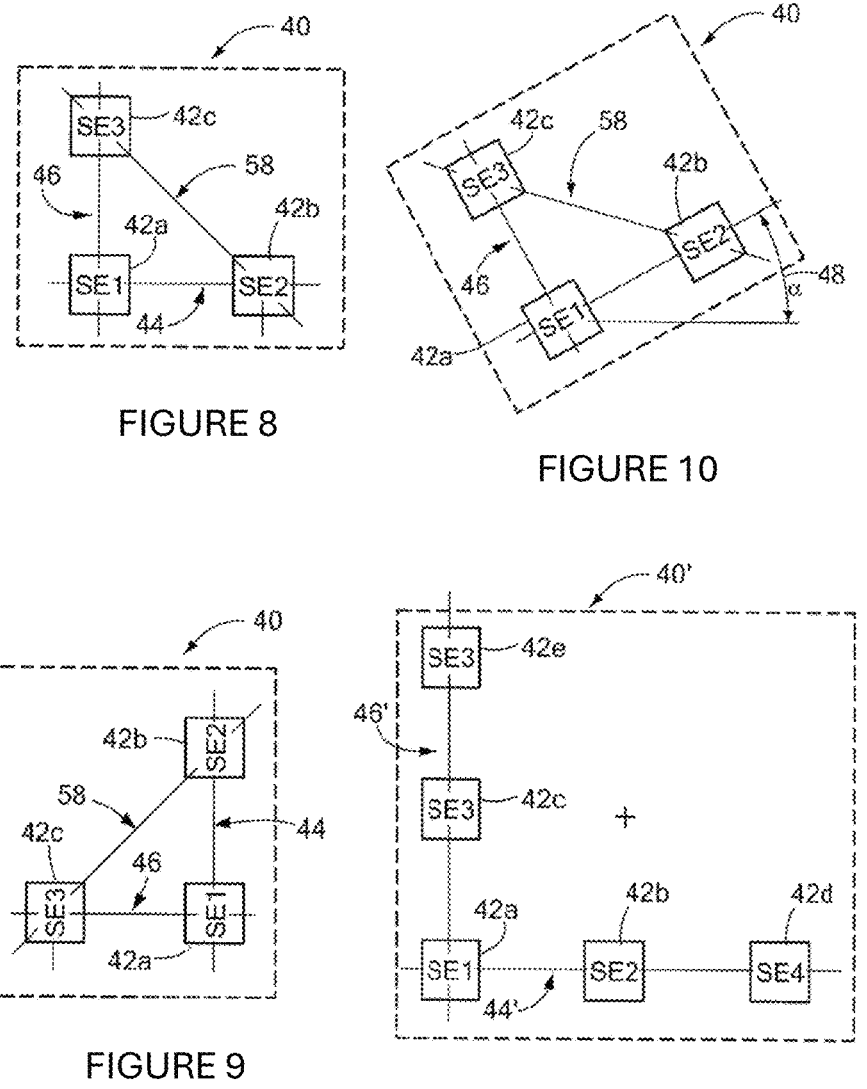

As shown in FIGS. 8-10, a third sensing axis 58 is defined by the arrangement of the sensing elements 42b ("SE2"), 42c ("SE3"). This third pair of sensing elements can be used to generate a third differential signal.

An additional element provided along each axis can be used to provide both rotational speed and direction information. As shown in FIG. 11, a structure shown as structure 40' has three sensing elements, sensing element 42a, sensing element 42b, and an additional sensing element ("SE4") 42d, aligned to form a first single sensing axis shown as sensing axis 44'. The structure 40' is further configured with three sensing elements, sensing element 42a, sensing element 42c, and an additional sensing element ("SE5") 42e, aligned to form a second single sensing axis 46'.

Figure 12:
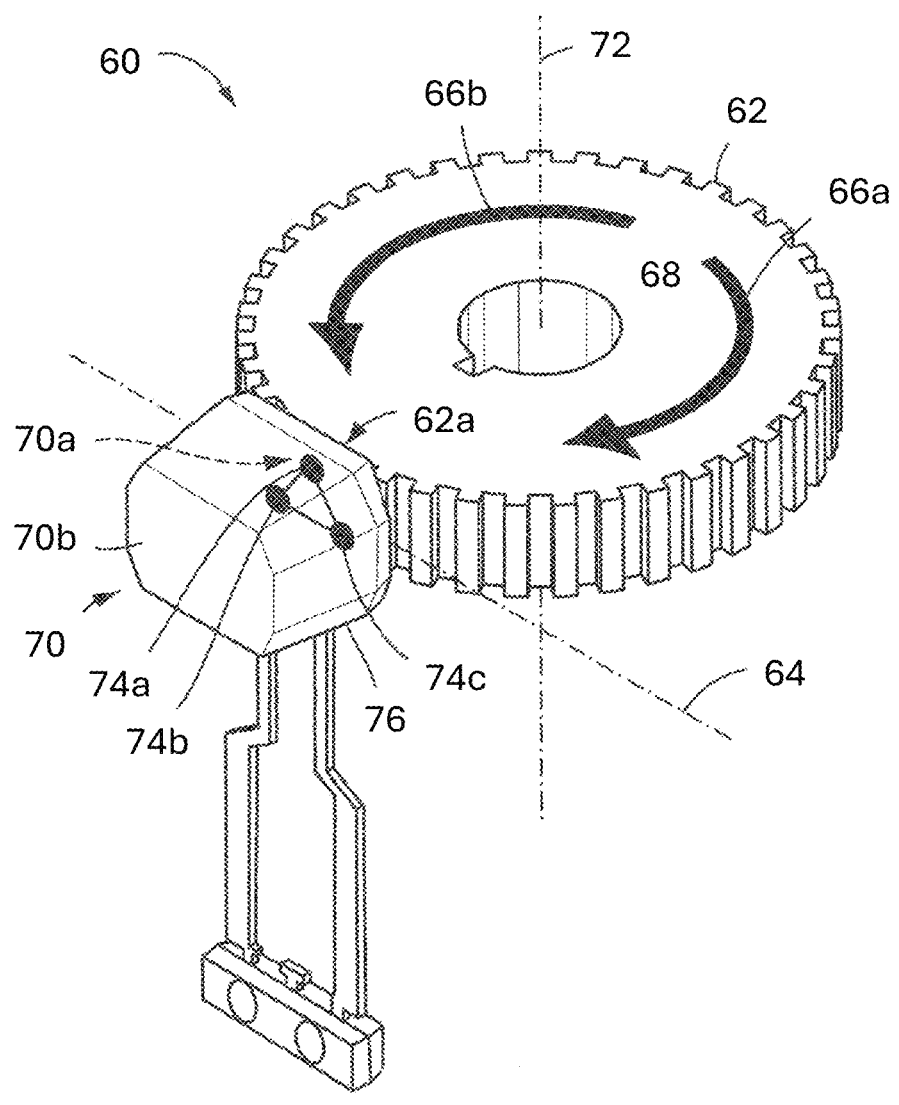
FIG. 12 illustrates an example of a magnetic field sensor configured for speed and direction sensing.

FIG. 12 illustrates an example of a magnetic field sensor configured for speed and direction sensing by processing sine and cosine signals and reducing a phase lag introduced by processing the sine and cosine signals. As illustrated in FIG. 12, a sensing arrangement 60 includes a magnetic field sensor 70 arranged in a radial sensing position relative to a rotating target 62. The sensor 70 includes at least first, second, and third magnetic field sensing elements 74a, 74b, 74c, respectively, and circuitry to generate a sensor output signal that is indicative of a speed and a direction of motion of the target that is independent of an installation angle of the sensor 70 relative to the target 62.

The target 62 rotates about an axis of rotation 72 in a target rotation plane face 70a of the sensor 70 opposes a profile 62a of the rotating target 62. A first direction of rotation of the target 62 is indicated by arrow 66a and a second, opposite direction of rotation is indicated by arrow 16b. Such rotation directions may be referred to as positive and negative rotation or forward and reverse rotation.

The designations of "positive" and "negative" and "forward" and "reverse" are arbitrary and may be varied without departing from the spirit of the disclosure. The definition of which relative target rotation direction is forward and which is reverse depends on the position of the magnetic field sensor 70 relative to the rotating target 62.

For a given position and rotation direction, the definition of forward and reverse can be programmed such that the device selects a specific pair of magnetic field sensing elements that determines the rotation direction for the given position. A mid-point of the height of the target profile 62a is labeled is reference axis 64.

The configuration of the magnetic field sensing elements 74a-74c and sensor circuitry not shown) used to generate the orientation independent sensor output signal permits the sensor 70 to be installed at any angle in a plane perpendicular to the target rotation plane 68. The term "orientation independent" as it is used herein to describe the sensor 70 and signals associated with the sensor means that the sensor and its output signal (including speed and direction information) is largely insensitive to the angle at which the sensor is positioned within the target rotation plane 68, although the position of the sensor 70 relative to the target 62 will establish the definition of positive and negative rotation directions for example.

With the described arrangements, both the speed and direction information provided by the sensor is largely insensitive to the angle at which the sensor is positioned (at installation time) and/or maintained (post-installation) relative to the target. Such tolerance of the orientation angle can greatly simplify sensor installation and maintenance, since manufacturing procedures and/or packaging designs required to meet the sensor-to-target alignment specifications are unnecessary.

Certain changes in the installation angle of the sensor relative to the target do not cause a direction indication change. Other installation angle changes that cross the target rotation plane 68 will cause a direction indication change.

The target 62 may be a magnetic or ferromagnetic object. The ferromagnetic object can be a magnetic object and the magnetic field detected by the magnetic field sensor 70 may be generated by the target itself and may vary depending on positions of the target relative to the sensor 70.

Alternatively, a separate source of a magnetic field may be provided (e.g., a permanent magnet or hard ferromagnetic material) as part of, or adjacent to the magnetic field sensor 70 and the magnetic field detected by the sensor 70 may be altered by movement of the ferromagnetic object. Such a separate magnet may be provided in the sensor package 76 on a side of the sensing elements 74a-74c opposite to the target 62, as indicated by optional magnet 70b.

Although the target 62 is shown in the form of a ferromagnetic gear in the example embodiment, the target may take other forms. For example, the target may take the form of a ring magnet having magnetic domains that are detected by the sensor 70. Additionally, the target 62 may be coupled to an automobile wheel, steering shaft, or a camshaft, as a few examples.

An example of a magnetic field sensor is disclosed in U.S. Pat. No. 9,605,975. The entire content of U.S. Pat. No. 9,605,975 is hereby incorporated by reference.

Figure 13:
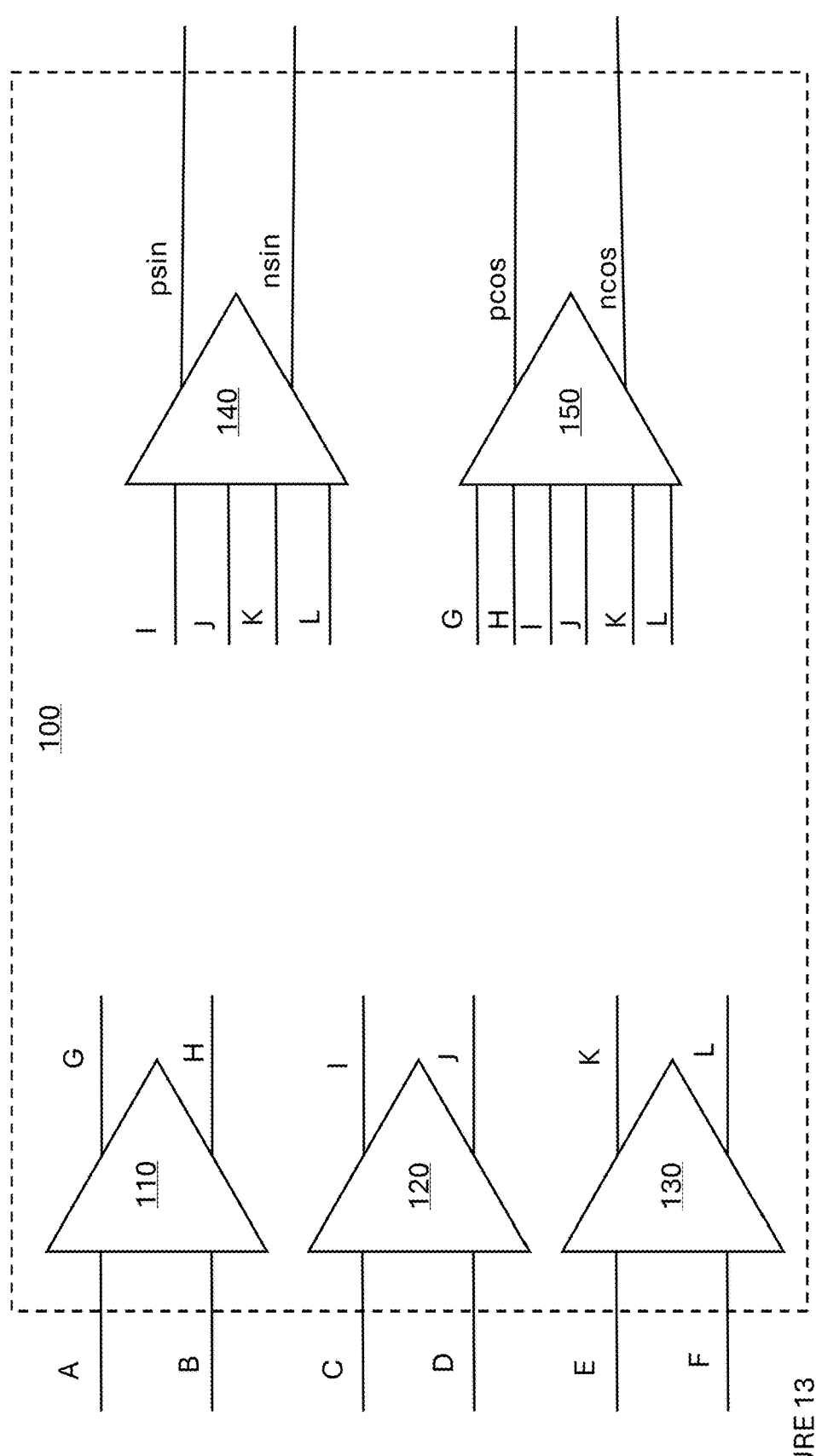
FIG. 13 illustrates an example of a signal condition circuit to process the sine and cosine signals.

FIG. 13 illustrates an example of a signal condition circuit to process the sine and cosine signals. As illustrated in FIG. 13, a signal condition circuit 100 includes differential operational amplifiers 110, 120, and 130. The differential operational amplifiers 110, 120, and 130 receive signals (A, B, C, D, E, and F) from sensing elements (not shown), as discussed above, with respect to FIGS. 2-12. The signal condition circuit 100 also includes a sine amplifier 140 and a cosine amplifier 150.

In the embodiment of FIG. 13, differential operational amplifier 110 produces output signals G and H; differential operational amplifier 120 produces output signals I and J; and differential operational amplifier 130 produces output signals K and L. Output signals I, J, K, and L are fed to sine amplifier 140 and cosine amplifier 150. Output signals G and H are fed to cosine amplifier 150.

Sine amplifier 140 generates a first sine signal (component) psin and a second sine signal (component) nsin. Cosine amplifier 150 generates a first cosine signal (component) pcos and a second cosine signal (component) ncos.

The signal condition circuit 100 introduces an output latency in the sine and cosine signals (components). Typically, the latency is realized at the lower frequencies of the rotating target. More specifically, the poles of the amplifiers used in the signal condition circuit produce a phase lag at the low frequencies of the rotating target that translates into a latency at the output.

Figure 14:
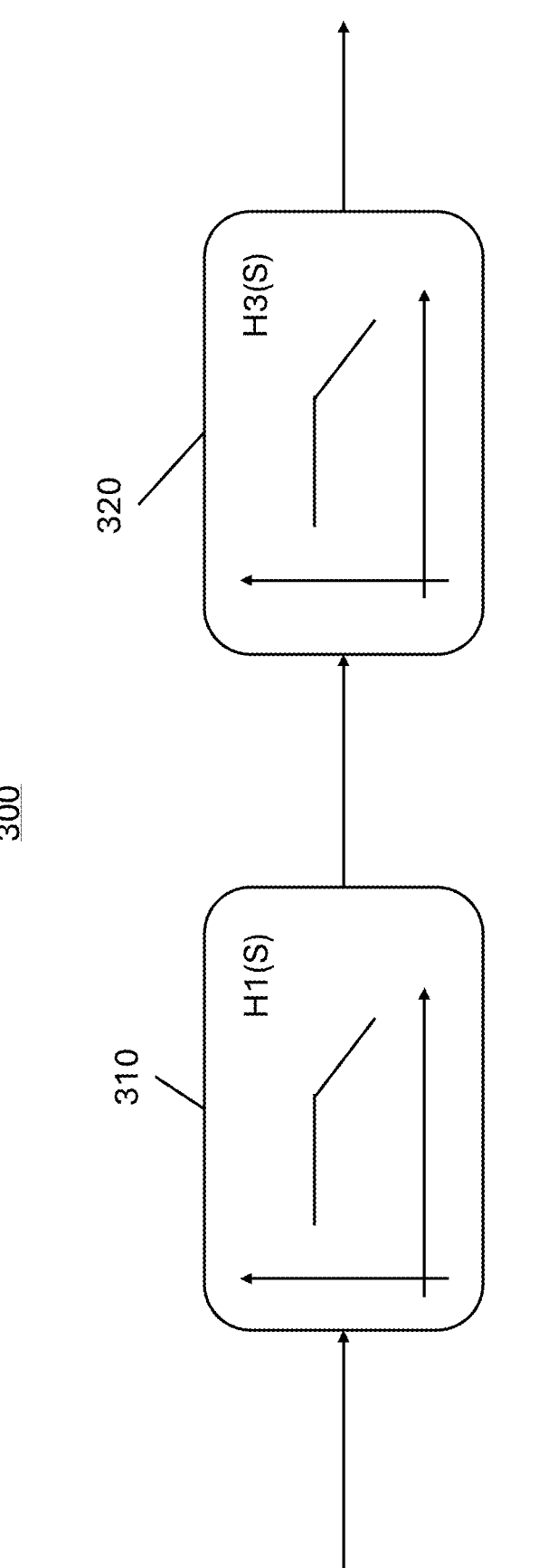
FIG. 14 illustrates a signal path of the signal condition circuit of FIG. 13.

FIG. 14 illustrates an analog signal path of the signal condition circuit of FIG. 13 that produces sine and cosine signals or sine and cosine components. As illustrated in FIG. 14, amplifiers H1(S) (310) and H3(S) (320) in the analog signal path 300 can be modeled as a first order (dominant) low pass filter. Typically, the first stage amplifier (310) has a larger cutoff frequency than the second stage amplifier (320).

For example, the first stage amplifier (310) may have a cutoff frequency of 100 KHz, while the second stage amplifier (320) may have a cutoff frequency of 25 KHz, wherein the frequency of the rotating target varies between 266 Hz and 833 Hz (corresponding to 16.000 and 50.000 RPM respectively).

Figure 15:
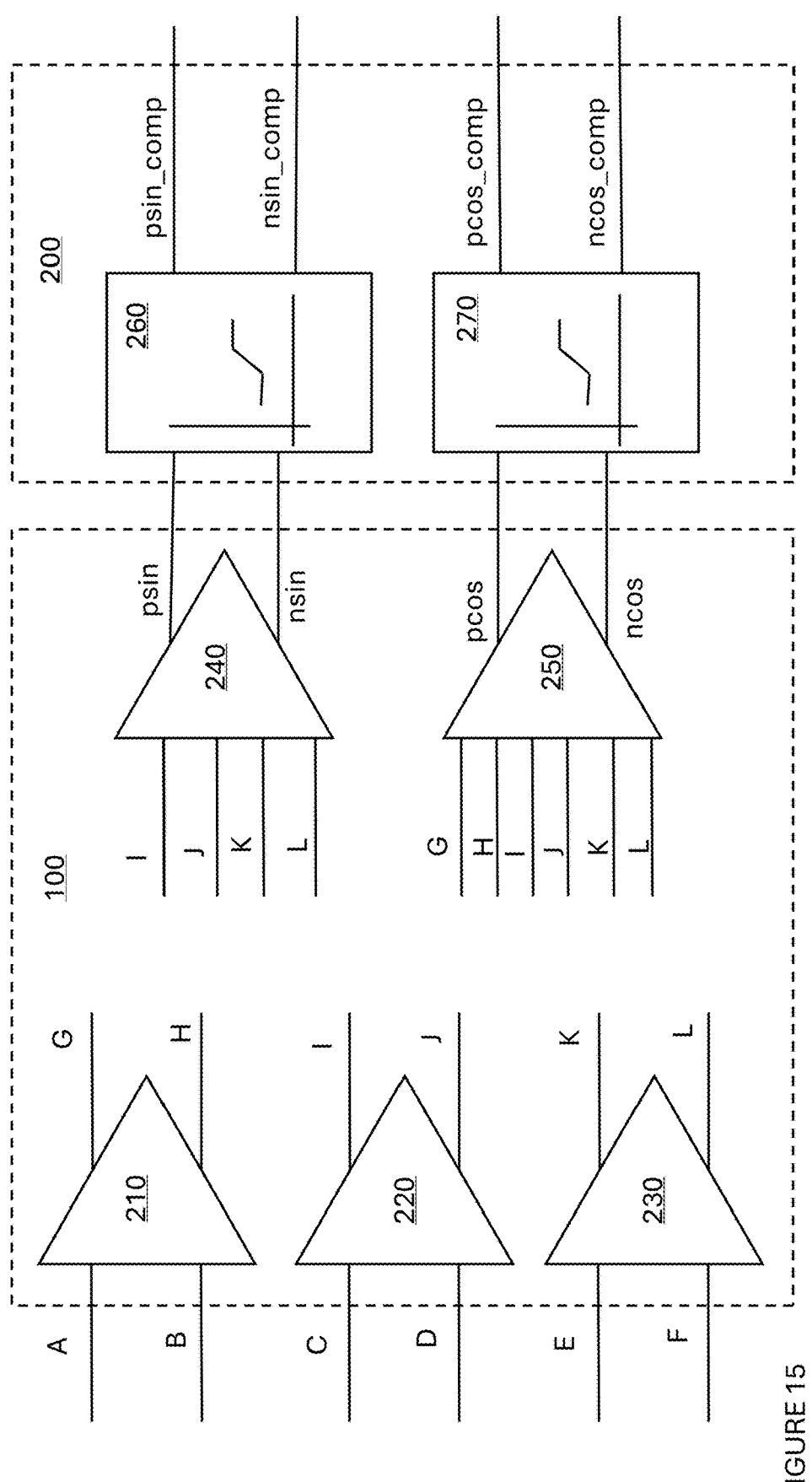
FIG. 15 illustrates a signal condition circuit with an output latency compensation circuit.

FIG. 15 illustrates a signal condition circuit with an output latency compensation circuit. As illustrated in FIG. 15, a signal condition circuit 100 is operatively connected to an output latency compensation circuit 200.

As discussed with respect to FIG. 13, the signal condition circuit 100 includes differential operational amplifiers 110, 120, and 130. The differential operational amplifiers 110, 120, and 130 receive signals (A, B, C, D, E, and F) from sensing elements (not shown), as discussed above, with respect to FIGS. 2-12. The signal condition circuit 100 also includes a sine amplifier 140 and a cosine amplifier 150.

In the embodiment of FIG. 15, differential operational amplifier 110 produces output signals G and H; differential operational amplifier 120 produces output signals I and J; and differential operational amplifier 130 produces output signals K and L. Output signals I, J, K, and L are fed to sine amplifier 140 and cosine amplifier 150. Output signals G and H are fed to cosine amplifier 150.

Sine amplifier 140 generates a first sine signal (component) psin and a second sine signal (component) nsin. Cosine amplifier 150 generates a first cosine signal (component) pcos and a second cosine signal (component) ncos.

As illustrated in FIG. 15, the first sine signal (component) psin, the second sine signal (component) nsin, the first cosine signal (component) pcos, and a second cosine signal (component) ncos are fed to the output latency compensation circuit 200.

The signal condition circuit 100 introduces an output latency in the sine and cosine signals (components). Typically, the latency is realized at the lower frequencies of the rotating target. More specifically, the poles of the amplifiers used in the signal condition circuit produce a phase lag at the low frequencies of the rotating target that translates into a latency at the output.

The output latency compensation circuit 200 includes a first phase lead filter 260 and a second phase lead filter 270. The first phase lead filter 260 receives the first sine signal (component) psin and the second sine signal (component) nsin. The second phase lead filter 270 receives the first cosine signal (component) pcos and a second cosine signal (component) ncos.

The introduction of phase lead filters (260 and 270), having a zero followed by a pole, introduces a phase lead that significantly reduces the phase (the output latency).

More specifically, the phase lead filters (260 and 270) reduce the output latency without increasing the amplifier bandwidth such that the phase lead filters (260 and 270) can improve or maintain output latency with a lower amplifier bandwidth.

It is noted that the signal condition circuit 100 and the phase lead filters (260 and 270) can be implemented a single IC package, or the phase lead filters (260 and 270) can be implemented off chip.

Figure 16:
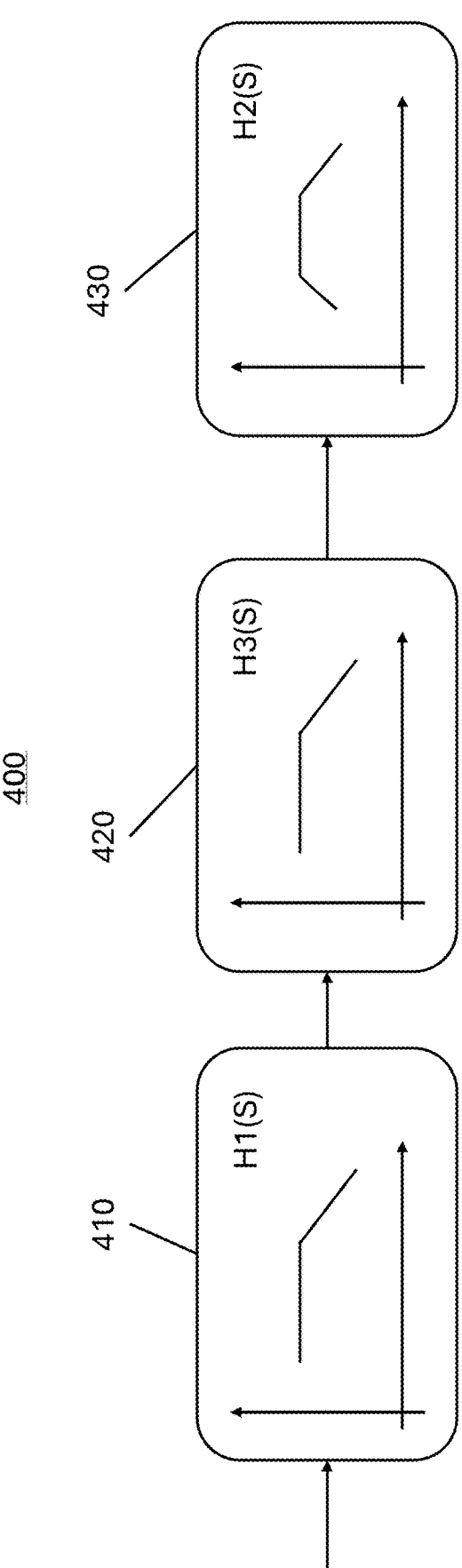
FIG. 16 illustrates a signal path of the signal condition circuit with an output latency compensation circuit of FIG. 15.

FIG. 16 illustrates an analog signal path of the signal condition circuit with an output latency compensation circuit of FIG. 15. As illustrated in FIG. 16, a phase lead compensation filter (H2(S)) 430 is introduced into the analog signal path 400 after amplifiers H1(S) (410) and H3(S) (420).

The introduction of the phase lead filter, having a zero followed by a pole (H2(S)), introduces a phase lead that significantly reduces the phase, and therefore, the output latency in the whole range of the rotating target, as will be discussed in more detail below.

It can be assumed that the analog phase lead compensation filter can be described as follows:

$$H2(s) = (S + Z0)/(S + P0).$$

The position of the zero (F_zero) and pole (F_pole) can be parameterized using two parameters: a central frequency F_1 and the distance of the zero and pole as a percentage "p" of the central frequency, so that:

$$F\_zero = F\_1 * (1 - p/2)$$
$$F\_pole = F\_1 * (1 + p/2).$$

The analog phase lead compensation filter H2(s) can be translated to the digital domain by applying the transformation:

$$S = \frac{2}{T_S} \frac{1 - z^{-1}}{1 + z^{-1}}$$

where $z^{-1}$ is the unit delay, and $T_S$ is the sampling time.

After applying the transformation, the digital implementation of the phase lead compensation filter H2(s) can be defined as:

$$H_2(s) = \frac{1 + \dfrac{k_0(1 - z^{-1})}{1 + z^{-1}}}{1 + \dfrac{k_p(1 - z^{-1})}{1 + z^{-1}}} = \frac{\dfrac{1 + z^{-1} + k_0(1 - z^{-1})}{1 + z^{-1}}}{\dfrac{1 + z^{-1} + k_p(1 - z^{-1})}{1 + z^{-1}}} = \frac{(1 + k_0) + z^{-1}(1 - k_0)}{(1 + k_p) + z^{-1}(1 - k_p)}$$

wherein $z^{-1}$ is a unit delay, $T_S$ is a sampling time, $$k_0 = \frac{2}{z_0 T_S} \text{ and } k_p = \frac{2}{p_0 T_S}.$$

Figure 17:
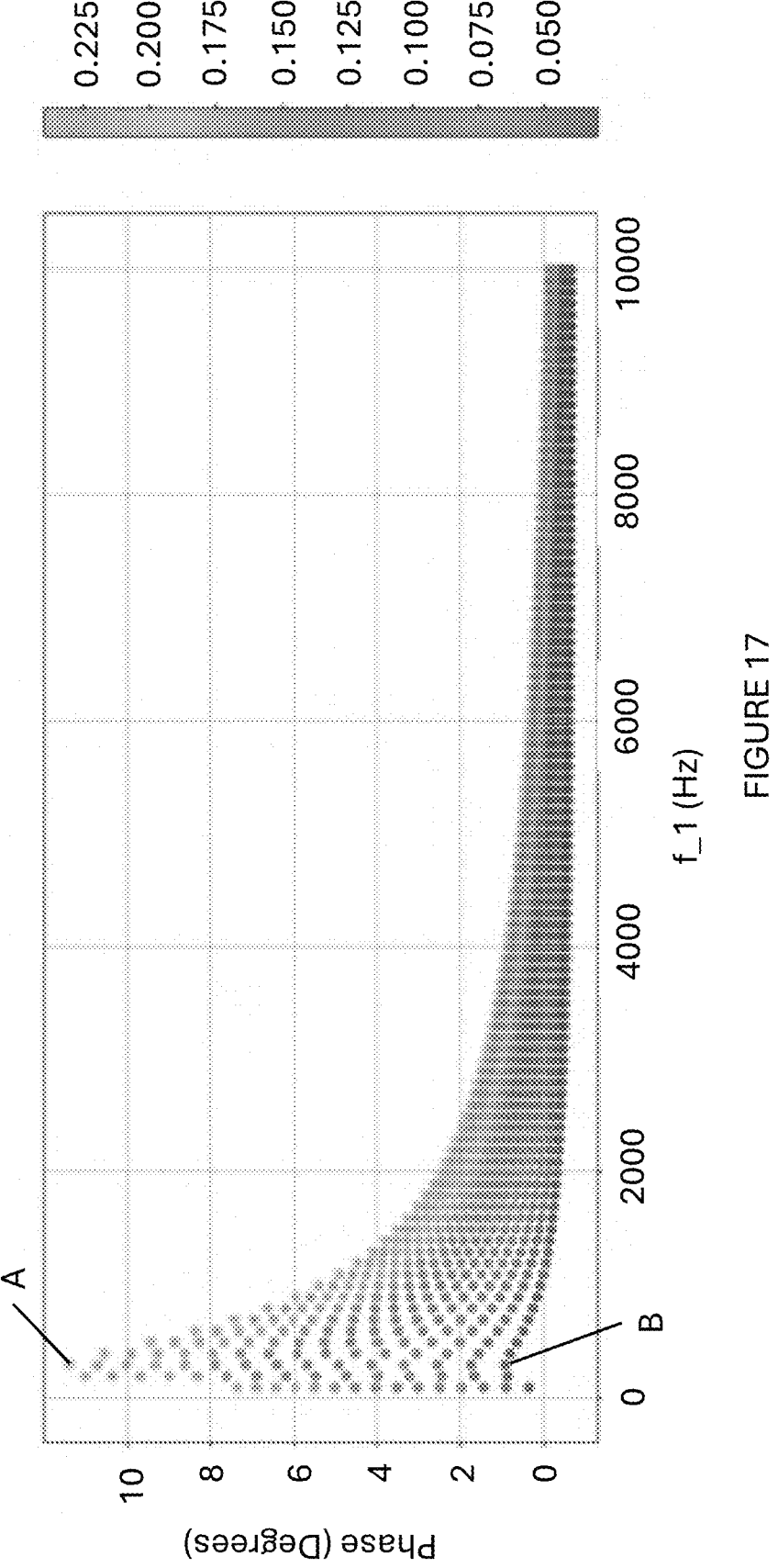
FIG. 17 illustrates a phase response for the compensated system of FIG. 15 at 266 Hz for different central frequencies and zero-pole separation.

FIG. 17 illustrates examples of phase responses for the compensated system of FIG. 15 at 266 Hz for different central frequencies and zero-pole separation. As illustrated in FIG. 17, the effect of the phase lead filter in the phase at the minimum rotating target frequency (266 Hz) for different central frequencies F_1 (x-axis) and zero-pole separation p (side gray bar) is shown, wherein the dotted line A corresponds to a zero-pole separation of approximately 0.225% and the dotted line B corresponds to a zero-pole separation of approximately 0.050%.

Figure 18:
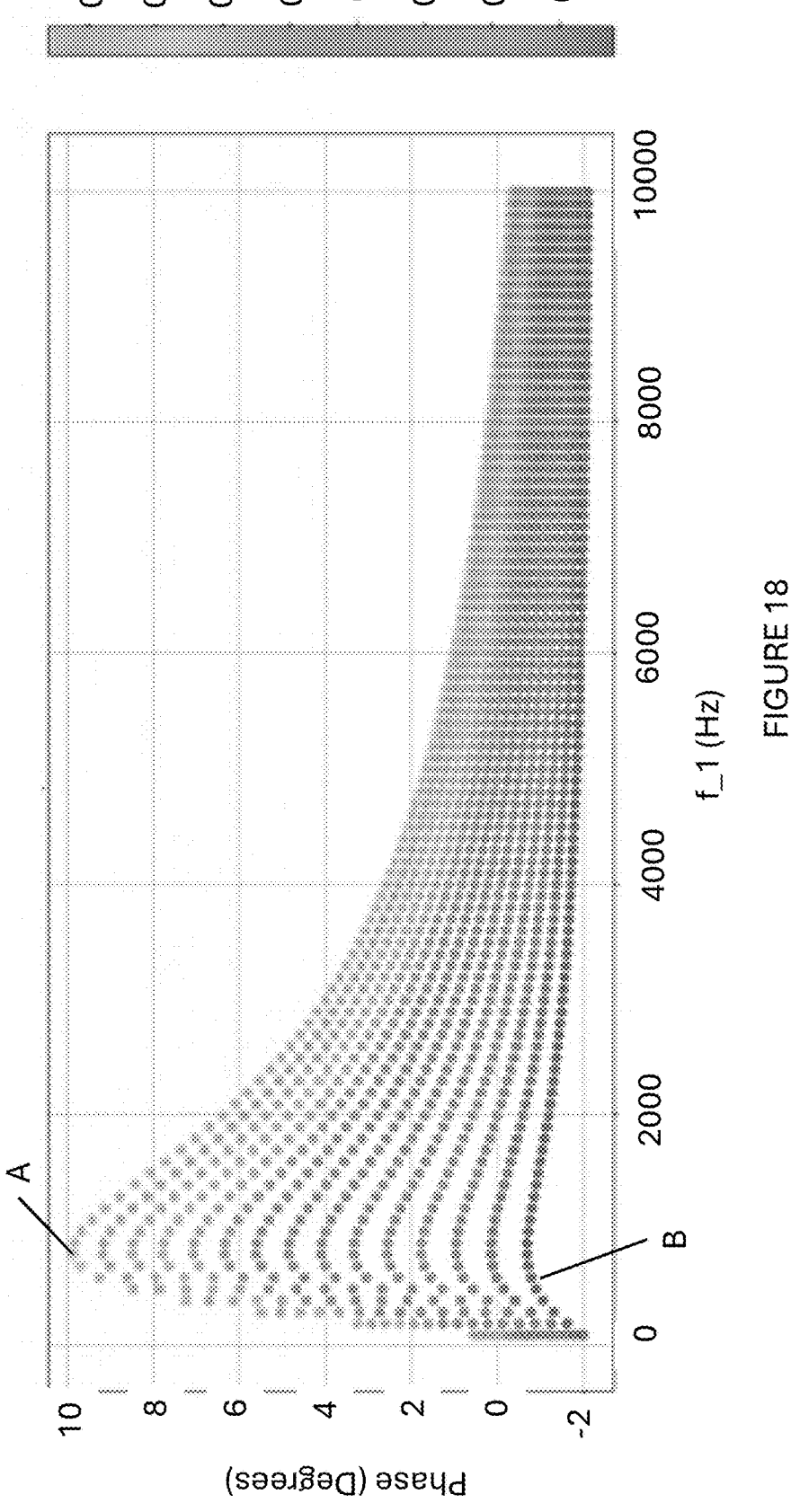
FIG. 18 illustrates a phase response for the compensated system of FIG. 15 at 833 Hz for different central frequencies and zero-pole separation.

FIG. 18 illustrates examples of phase responses for the compensated system of FIG. 15 at 833 Hz for different central frequencies and zero-pole separation. As illustrated in FIG. 18, the effect of the phase lead filter in the phase at the maximum rotating target frequency (833 Hz) for different central frequencies F_1 (x-axis) and zero-pole separation p (side gray bar) is shown, wherein the dotted line A corresponds to a zero-pole separation of approximately 0.225% and the dotted line B corresponds to a zero-pole separation of approximately 0.050%.

It is noted that in the examples illustrated in FIGS. 17 and 18, the phase is monotonic between the two extremes (266 Hz-833 Hz), so minimizing the phase at these two points minimizes the phase in the intermediate range.

Figure 19:
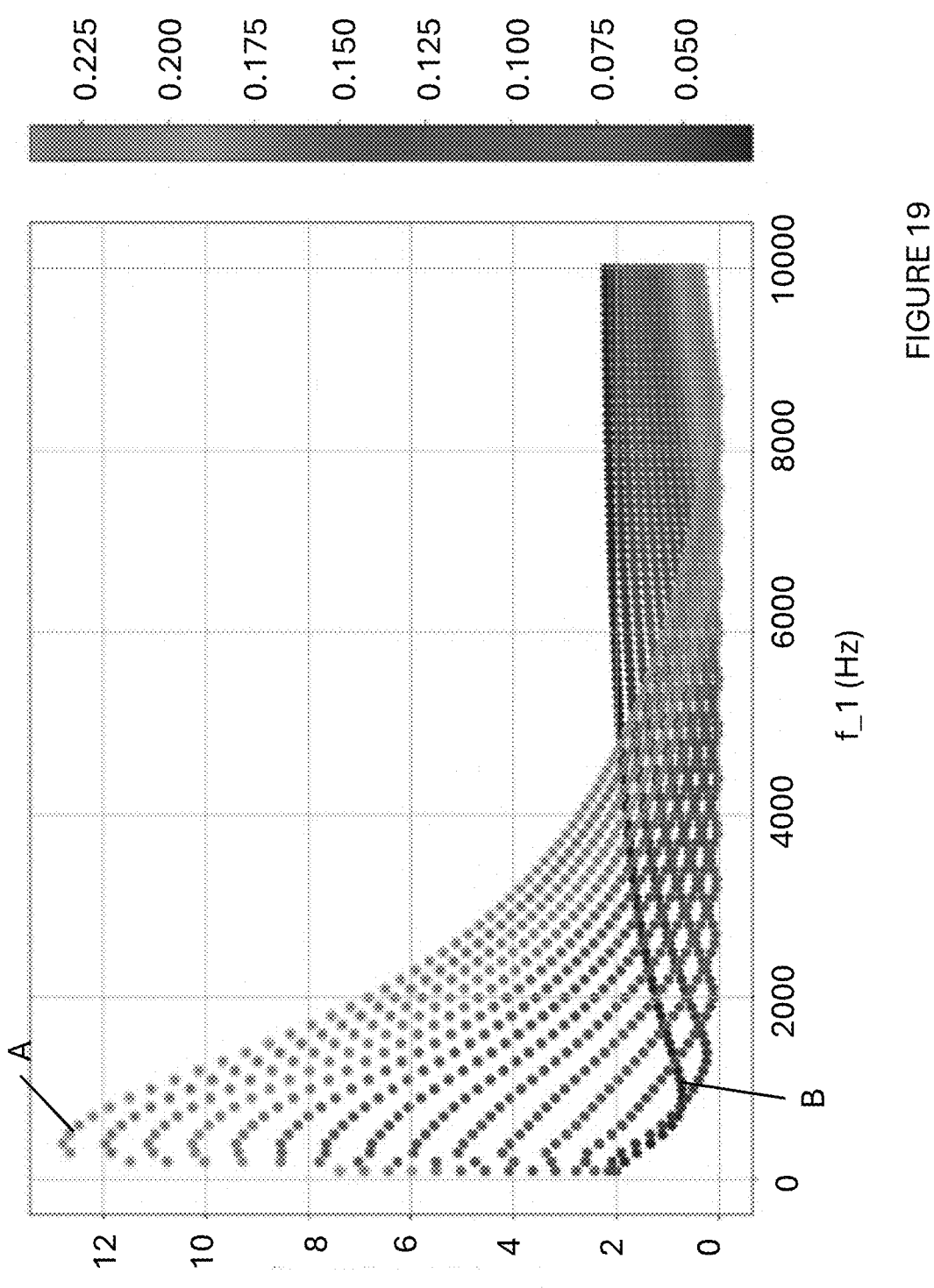
FIG. 19 illustrates a total phase error for the compensated system of FIG. 15 at extreme frequencies.

FIG. 19 illustrates examples of total phase errors for the compensated system of FIG. 15 at extreme frequencies for different central frequencies and zero-pole separation. As illustrated in FIG. 19, the total phase errors at extreme frequencies for different central frequencies F_1 (x-axis) and zero-pole separation p (side gray bar) is shown, wherein the dotted line A corresponds to a zero-pole separation of approximately 0.225% and the dotted line B corresponds to a zero-pole separation of approximately 0.050%.

The total phase error is calculated as:

$$Err = Sqrt\left[\text{phase}^2(266) + \text{phase}^2(833)\right].$$

The following is a list of combinations of parameters that produce the minimum phase errors, as illustrated in FIG. 19.

| Percentage (p) | Err | F_1 (Hz) |
| --- | --- | --- |
| 0.03 | 0.7152 | 900 |
| 0.045 | 0.2353 | 1400 |
| 0.06 | 0.1121 | 2000 |
| 0.075 | 0.069 | 2700 |
| 0.09 | 0.0504 | 3300 |
| 0.105 | 0.0376 | 3800 |
| 0.12 | 0.0234 | 4400 |
| 0.135 | 0.0301 | 5000 |
| 0.15 | 0.0155 | 5500 |
| 0.165 | 0.0164 | 6000 |
| 0.18 | 0.0205 | 6600 |
| 0.195 | 0.0133 | 7100 |
| 0.21 | 0.0093 | 7600 |
| 0.225 | 0.0074 | 8100 |
| 0.24 | 0.0065 | 8600 |

Figure 20:
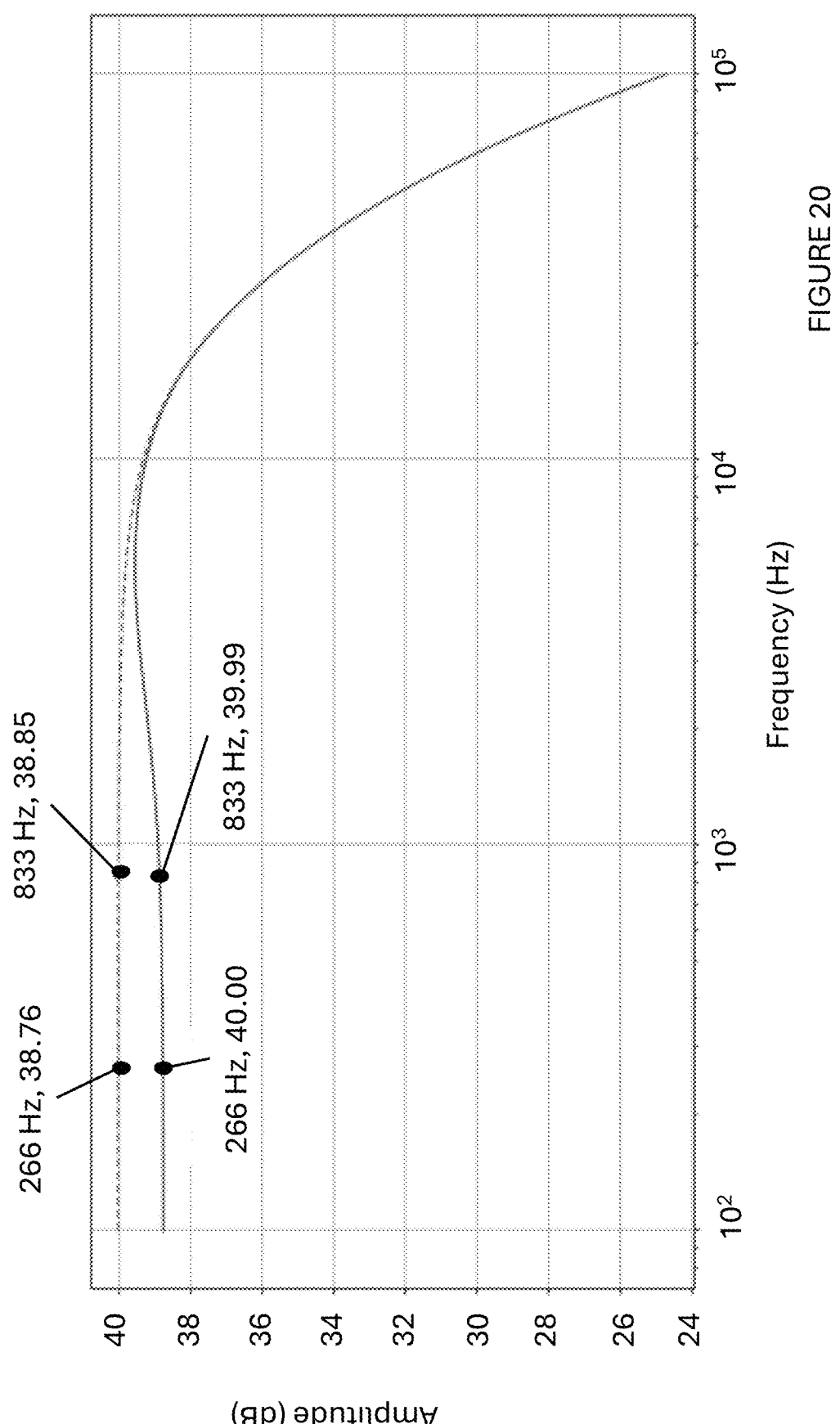
FIG. 20 illustrates an amplitude comparison between the uncompensated system of FIG. 13 and the compensated system of FIG. 15 for a central frequency of 2.7 KHz.

FIG. 20 illustrates an amplitude comparison between the uncompensated system of FIG. 13 and the compensated system of FIG. 15 for a central frequency of 2.7 KHz. As illustrated in FIG. 20, the plot shows a comparison of amplitudes between the original system of FIG. 13 (dotted line) and the compensated system of FIG. 15 (solid line) for a central frequency of 2.7 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

Figure 21:
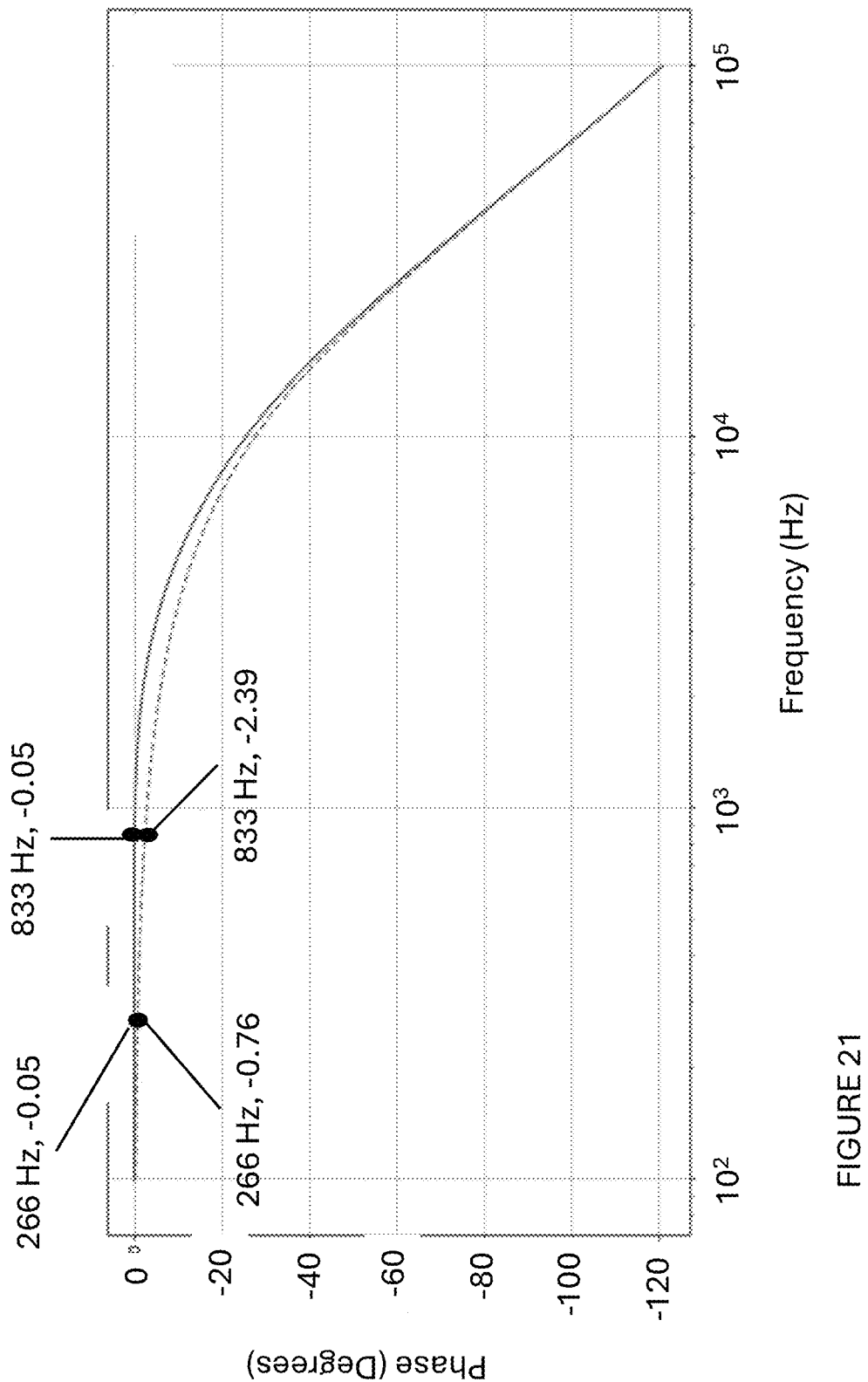
FIG. 21 illustrates a phase comparison between the uncompensated system of FIG. 13 and the compensated system of FIG. 15 for a central frequency of 2.7 KHz.

FIG. 21 illustrates a phase comparison between the uncompensated system of FIG. 13 and the compensated system of FIG. 15 for a central frequency of 2.7 KHz, As illustrated in FIG. 21, the plot shows a comparison of phases between the original system of FIG. 13 (dotted line) and the compensated system of FIG. 15 (solid line) for a central frequency of 2.7 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

Figure 22:
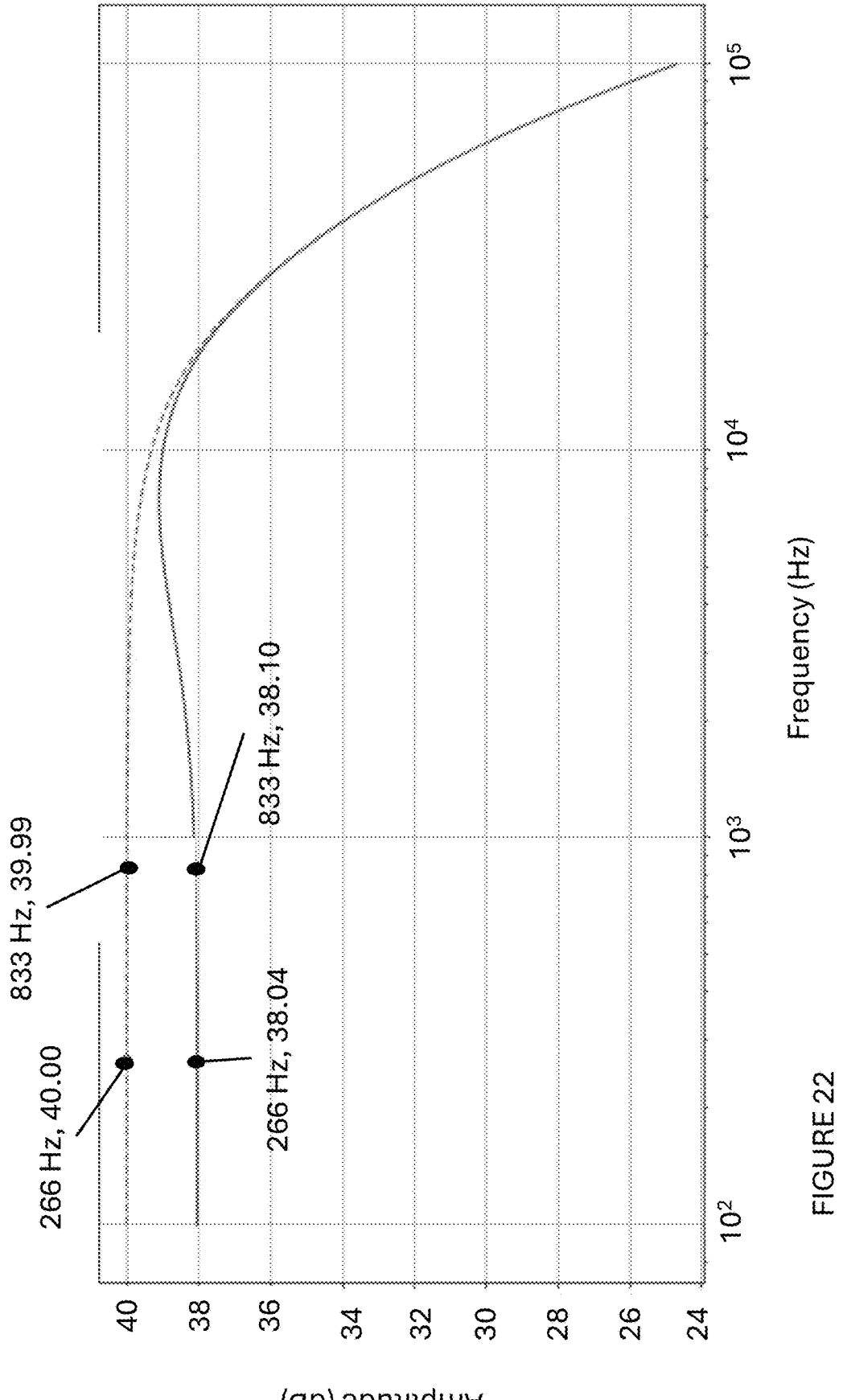
FIG. 22 illustrates an amplitude comparison between the uncompensated system of FIG. 13 and the compensated system of FIG. 15 for a central frequency of 4.4 KHz.

FIG. 22 illustrates an amplitude comparison between the uncompensated system of FIG. 13 and the compensated system of FIG. 15 for a central frequency of 4.4 KHz. As illustrated in FIG. 22, the plot shows a comparison of amplitudes between the original system of FIG. 13 (dotted line) and the compensated system of FIG. 15 (solid line) for a central frequency of 4.4 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

Figure 23:
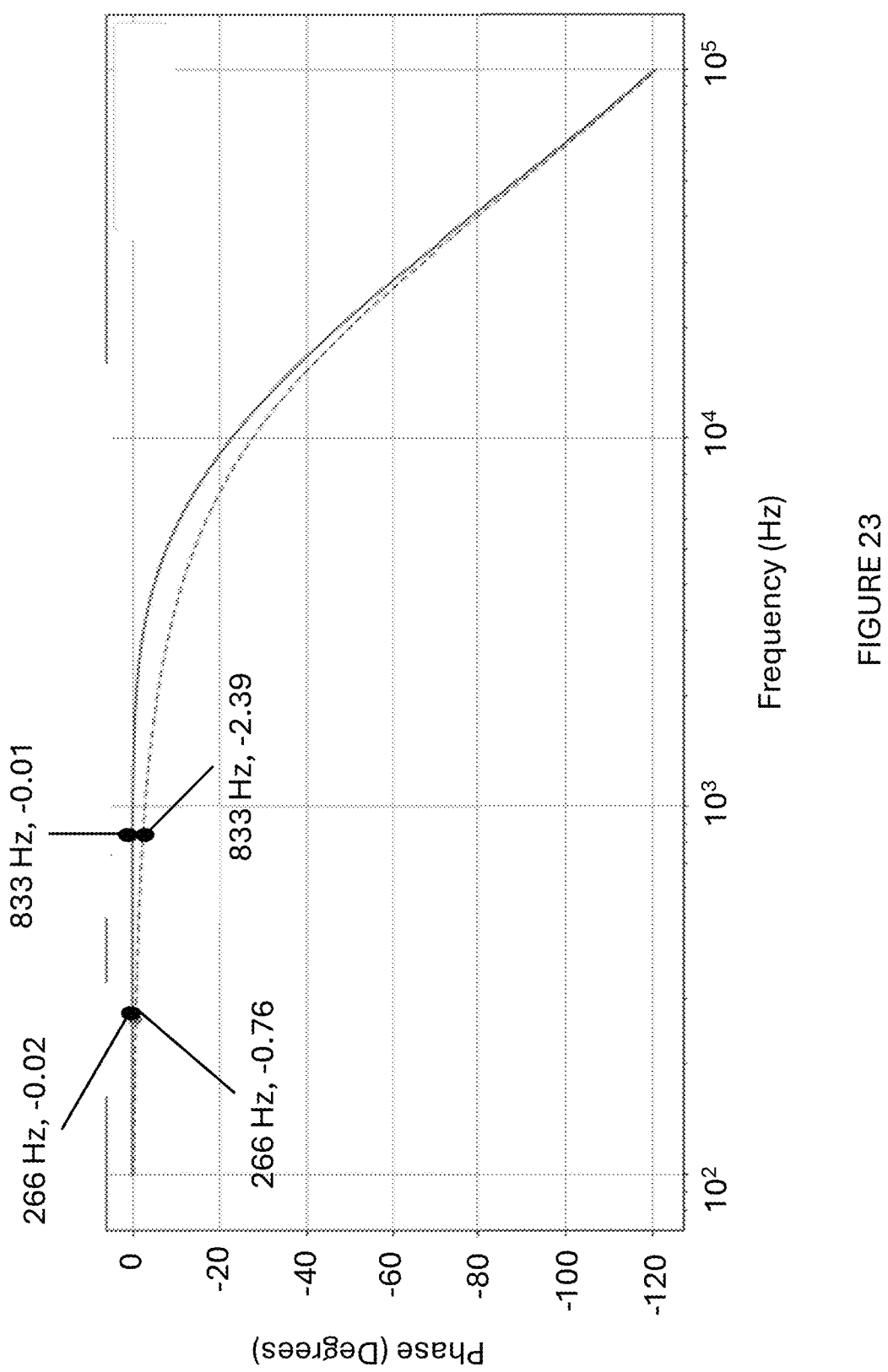
FIG. 23 illustrates a phase comparison between the uncompensated system of FIG. 13 and the compensated system of FIG. 15 for a central frequency of 4.4 KHz.

FIG. 23 illustrates a phase comparison between the uncompensated system of FIG. 13 and the compensated system of FIG. 15 for a central frequency of 4.4 KHz. As illustrated in FIG. 23, the plot shows a comparison of phases between the original system of FIG. 13 (dotted line) and the compensated system of FIG. 15 (solid line) for a central frequency of 4.4 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

Figure 24:
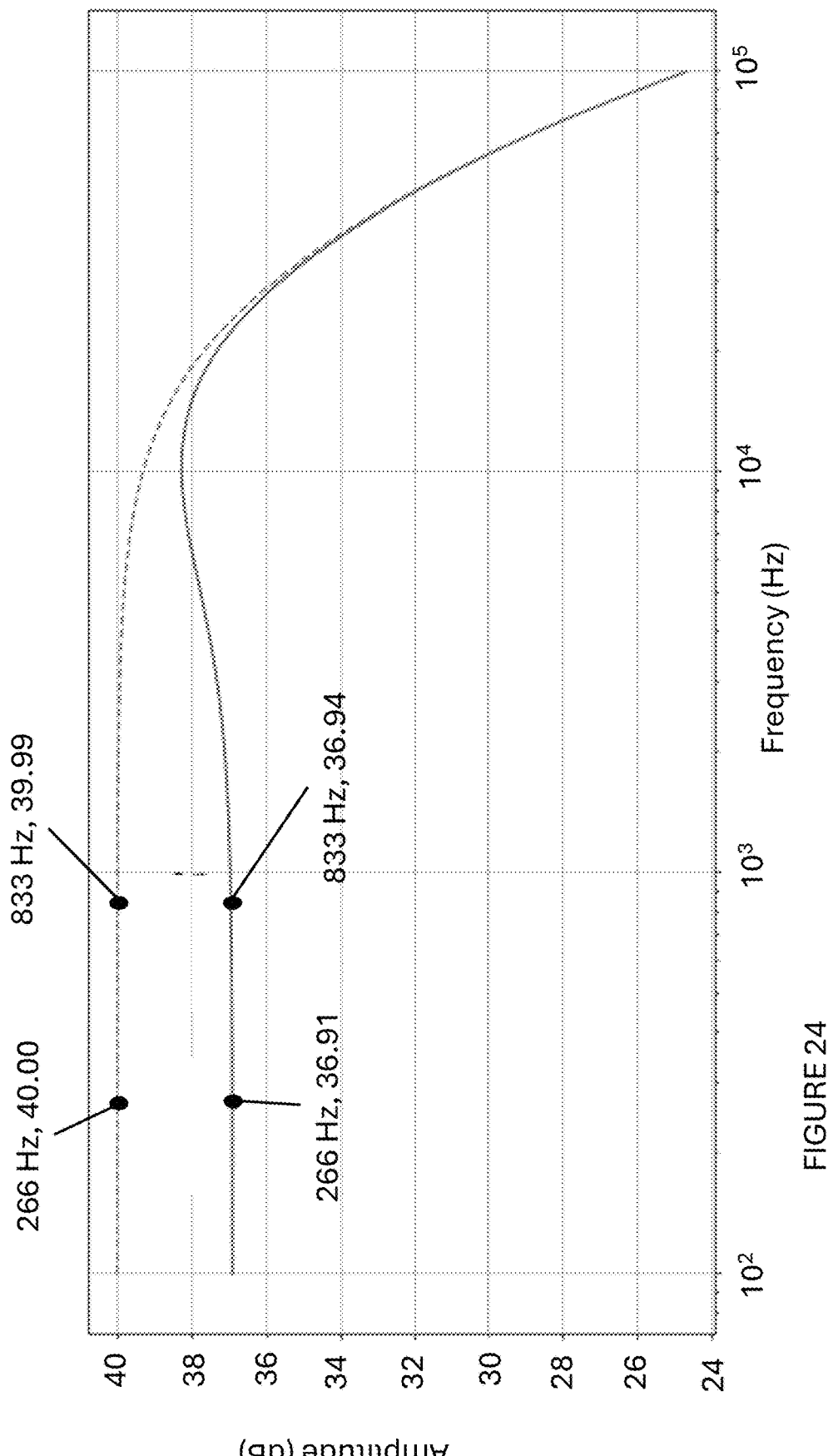
FIG. 24 illustrates an amplitude comparison between the uncompensated system of FIG. 13 and the compensated system of FIG. 15 for a central frequency of 7.1 KHz.

FIG. 24 illustrates an amplitude comparison between the uncompensated system of FIG. 13 and the compensated system of FIG. 15 for a central frequency of 7.1 KHz. As illustrated in FIG. 24, the plot shows a comparison of amplitudes between the original system of FIG. 13 (dotted line) and the compensated system of FIG. 15 (solid line) for a central frequency of 7.1 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

Figure 25:
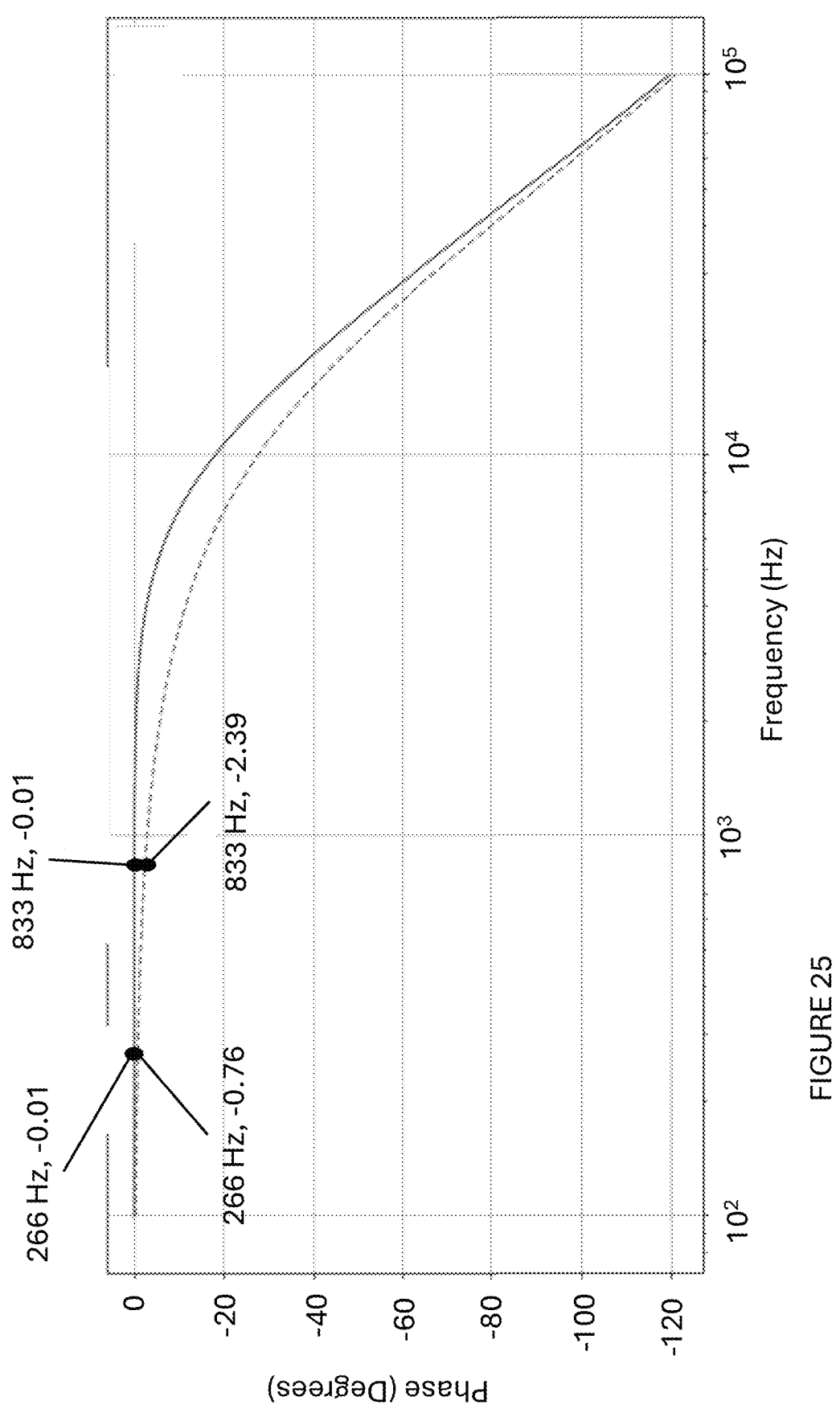
FIG. 25 illustrates a phase comparison between the uncompensated system of FIG. 13 and the compensated system of FIG. 15 for a central frequency of 7.1 KHz.

FIG. 25 illustrates a phase comparison between the uncompensated system of FIG. 13 and the compensated system of FIG. 15 for a central frequency of 7.1 KHz. As illustrated in FIG. 25, the plot shows a comparison of phases between the original system of FIG. 13 (dotted line) and the compensated system of FIG. 15 (solid line) for a central frequency of 7.1 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

Figure 26:
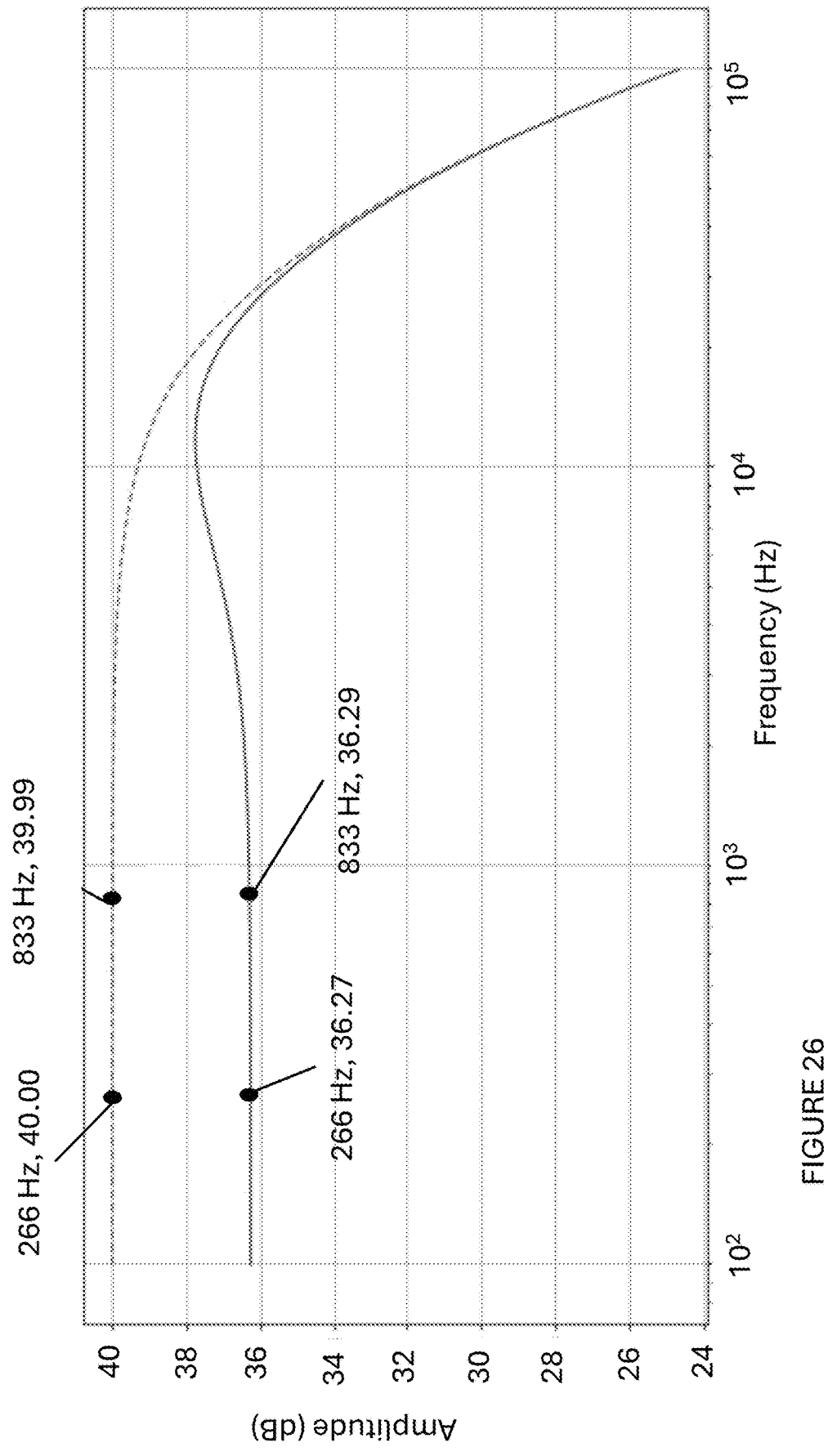
FIG. 26 illustrates an amplitude comparison between the uncompensated system of FIG. 13 and the compensated system of FIG. 15 for a central frequency of 8.6 KHz.

FIG. 26 illustrates an amplitude comparison between the uncompensated system of FIG. 13 and the compensated system of FIG. 15 for a central frequency of 8.6 KHz. As illustrated in FIG. 26, the plot shows a comparison of amplitudes between the original system of FIG. 13 (dotted line) and the compensated system of FIG. 15 (solid line) for a central frequency of 8.6 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

Figure 27:
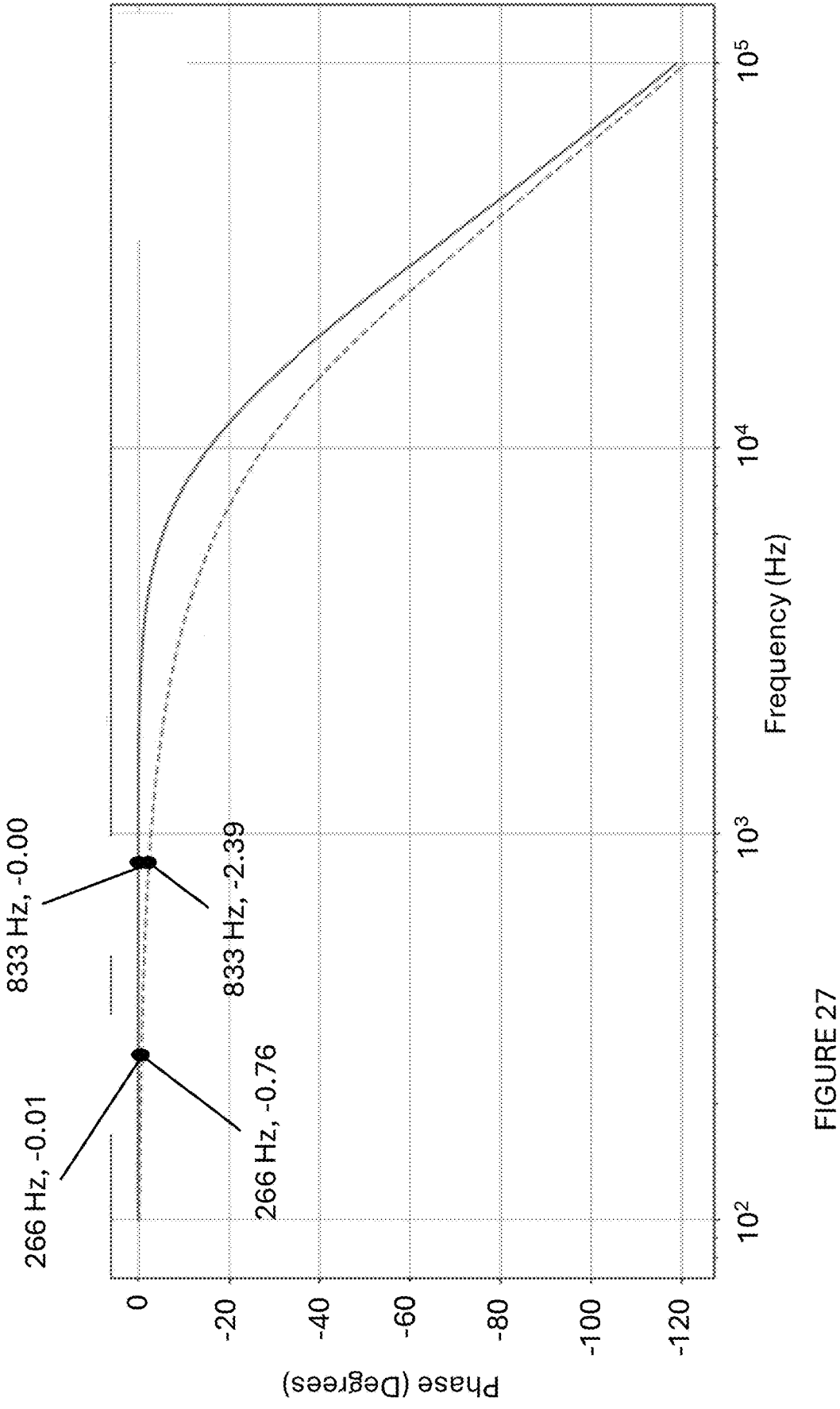
FIG. 27 illustrates a phase comparison between the uncompensated system of FIG. 13 and the compensated system of FIG. 15 for a central frequency of 8.6 KHz.

FIG. 27 illustrates a phase comparison between the uncompensated system of FIG. 13 and the compensated system of FIG. 15 for a central frequency of 8.6 KHz. As illustrated in FIG. 27, the plot shows a comparison of phases between the original system of FIG. 13 (dotted line) and the compensated system of FIG. 15 (solid line) for a central frequency of 8.6 KHz.

There is a gain difference in the range of interest with respect to the non-compensated system. This is an offset that can be (and is routinely) compensated. It is noted, in this example, that the mismatch of the gain for the compensated curve at the extremes (266 Hz and 833 Hz) is like the non-compensated response (negligible in both cases).

With respect to the plots shown in FIGS. 20-27, the following Table shows simulated results of latency (Latency) and compensated latency (Compensated Latency) for the systems of FIG. 13 and FIG. 15, respectively. With the implementation of the phase lead filter, the system shows about a 16× improvement.

TABLE

| FREQ (Hz) | CENTRAL FREQ (KHz) | LATENCY | COM- PENSATED LATENCY | POLE (KHz) | ZERO (KHz) |
|---|---|---|---|---|---|
| 266 | 2.7 | 8.452µ | −2.39 n | 2.903 | 2.512 |
| 266 | 4.4 | 8.452µ | 262.7 n | 4.928 | 3.929 |
| 266 | 7.1 | 8.452µ | 431 n | 8.485 | 5.941 |
| 266 | 8.6 | 8.452µ | 433 n | 10.66 | 6.935 |
| 833 | 2.7 | 8.454µ | 648.3 n | 2.903 | 2.512 |
| 833 | 4.4 | 8.454µ | 504.4 n | 4.928 | 3.929 |
| 833 | 7.1 | 8.454µ | 519.8 n | 8.485 | 5.941 |
| 833 | 8.6 | 8.454µ | 492.7 n | 10.66 | 6.935 |

As noted above, a speed sensor device with latency compensation includes sensing elements to sense an angle of a moving target and to generate sine and cosine signals in response thereto; a signal condition circuit to process the sine and cosine signals, the processed sine and cosine signals having a phase lag introduced by the signal condition circuit; and a phase lead filter to receive the processed sine and cosine signals and to reduce the phase lag in the processed sine and cosine signals.

The phase lead filter consists of a zero followed by a pole. The phase lead filter reduces the phase lag in the processed sine and cosine signals at frequencies greater than a first threshold frequency, the first threshold frequency corresponding to a lowest speed of the moving target. The phase lead filter also reduces the phase lag in the processed sine and cosine signals at frequencies less than a second threshold frequency, the second threshold frequency corresponding to a highest speed of the moving target.

It is noted that although the above description used specific frequency examples, the latency compensated system can be utilized to compensate for latency in a variety of frequency ranges.

It is noted that the latency compensated system, as described above, reduces significantly the output latency without increasing the amplifier bandwidth. In other words, the latency compensated system, as described above, improves or maintains output latency with a lower amplifier bandwidth.

Moreover, the latency compensated system, as described above, does not require knowledge of the speed of the target.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing magnetic or ferromagnetic articles, for example, magnetic domains of a ring magnet or a ferromagnetic target (e.g., gear teeth) where the magnetic field sensor may be used in combination with a back-biased or other magnet, and a magnetic field sensor that senses a density of a magnetic field.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall element, a vertical Hall element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ).

The magnetic field sensing element may be a single element or, alternatively, may include two or more magnetic field sensing elements arranged in various configurations, e.g., a half bridge or full (Wheatstone) bridge, Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As used herein, the term "processor" is used to describe an electronic circuit that performs a function, an operation, or a sequence of operations. The function, operation, or sequence of operations can be hard coded into the electronic circuit or soft coded by way of instructions stored in a memory device. A "processor" can perform the function, operation, or sequence of operations using digital values or using analog signals.

In some embodiments, the "processor" can be embodied, for example, in a specially programmed microprocessor, a digital signal processor (DSP), or an application specific integrated circuit (ASIC), which can be an analog ASIC or a digital ASIC. Additionally, in some embodiments the "processor" can be embodied in configurable hardware such as field programmable gate arrays (FPGAs) or programmable logic arrays (PLAs).

In some embodiments, the "processor" can also be embodied in a microprocessor with associated program memory. Furthermore, in some embodiments the "processor" can be embodied in a discrete electronic circuit, which can be analog or digital.

It will be appreciated that variations of the above-disclosed embodiments and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the description above and the following claims.

What is claimed is:

1. A sensor device comprising:

sensing elements to sense an angle of a moving target and to generate sine and cosine signals in response thereto;

a signal condition circuit to process the sine and cosine signals, the processed sine and cosine signals having a phase lag introduced by the signal condition circuit; and a phase lead filter to receive the processed sine and cosine signals and to reduce the phase lag in the processed sine and cosine signals, wherein the phase lead filter reduces the phase lag in the processed sine and cosine signals only at frequencies between a first threshold frequency corresponding to a lowest speed of the moving target and a second threshold frequency corresponding to a highest speed of the moving target.

2. The sensor device as claimed in claim 1, wherein the phase lead filter reduces the phase lag in the processed sine and cosine signals at frequencies greater than a first threshold frequency, the first threshold frequency corresponding to a lowest speed of the moving target.

3. The sensor as claimed in claim 2, wherein the phase lead filter reduces the phase lag in the processed sine and cosine signals at frequencies less than a second threshold frequency, the second threshold frequency corresponding to a highest speed of the moving target.

4. The sensor device as claimed in claim 1, wherein the phase lead filter reduces the phase lag in the processed sine and cosine signals at frequencies less than a second threshold frequency corresponding to a highest speed of the moving target and greater than a first threshold frequency corresponding to a lowest speed of the moving target.

5. The sensor device as claimed in claim 1, wherein the phase lead filter has a zero followed by a pole.

6. The sensor device as claimed in claim 5, wherein the phase lead filter is defined in an analog domain by H(S)= (1+S/Z0)/(1+S/P0), wherein H(S) defines the analog domain of the phase lead filter, S is a complex function in the frequency domain, Z0 represents a zero frequency and P0 represents a pole frequency.

7. The sensor device as claimed in claim 1, wherein the signal condition circuit includes amplifiers.

8. The sensor device as claimed in claim 1, wherein the sensing elements comprise magnetic field sensing elements to sense the angle of the moving target.

9. The sensor device as claimed in claim 1, wherein the signal condition circuit and the phase lead filter are located on a single IC package.

10. The sensor device as claimed in claim 1, wherein the signal condition circuit and the phase lead filter are not co-located on a single IC package.

11. A sensor device comprising:

sensing elements to sense an angle of a moving target and to generate sine and cosine signals in response thereto;

a signal condition circuit to process the sine and cosine signals, the processed sine and cosine signals having a phase lag introduced by the signal condition circuit; and a phase lead filter to receive the processed sine and cosine signals and to reduce the phase lag in the processed sine and cosine signals, wherein the phase lead filter reduces the phase lag in the processed sine and cosine signals at frequencies less than or equal to a second threshold frequency corresponding to a highest speed of the moving target and greater than or equal to a first threshold frequency corresponding to a lowest speed of the moving target.

12. A sensor device comprising:

sensing elements to sense an angle of a moving target and to generate sine and cosine signals in response thereto;

a signal condition circuit to process the sine and cosine signals, the processed sine and cosine signals having a phase lag introduced by the signal condition circuit; and a phase lead filter to receive the processed sine and cosine signals and to reduce the phase lag in the processed sine and cosine signals, wherein the phase lead filter has a zero followed by a pole, wherein the phase lead filter is defined in an analog domain by H(S)=(1+S/Z0)/(1+S/P0).

wherein the phase lead filter is defined in a digital domain by:

$$H_2(s) = \frac{1 + \dfrac{k_0(1-z^{-1})}{1+z^{-1}}}{1 + \dfrac{k_p(1-z^{-1})}{1+z^{-1}}} = \frac{\dfrac{1+z^{-1}+k_0(1-z^{-1})}{1+z^{-1}}}{\dfrac{1+z^{-1}+k_p(1-z^{-1})}{1+z^{-1}}} = \frac{(1+k_0)+z^{-1}(1-k_0)}{(1+k_p)+z^{-1}(1-k_p)}$$

wherein $z^{-1}$ is a unit delay, $T_S$ is a sampling time, $$k_0 = \frac{2}{z_0 T_S} \text{ and } k_p = \frac{2}{p_0 T_S},$$

$z_0$ is a zero frequency and $p_0$ is a pole frequency.

13. A method comprising:

(a) generating a sine signal and a cosine signal corresponding to a sensed angle of a moving target;

(b) processing the sine and cosine signals, the processed sine and cosine signals having a phase lag introduced by the processing thereof; and (c) introducing a phase lead to the processed sine and cosine signals to reduce the phase lag in the processed sine and cosine signals, wherein the (c) reduces the phase lag in the processed sine and cosine signals at frequencies less than or equal to a second threshold frequency corresponding to a highest speed of the moving target and greater than or equal to a first threshold frequency corresponding to a lowest speed of the moving target.

14. The method as claimed in claim 13, wherein the (c) reduces the phase lag in the processed sine and cosine signals using a phase lead filter having a zero followed by a pole.

15. The method as claimed in claim 13, wherein the (a) generates a sine signal and a cosine signal corresponding to an angle, sensed by magnetic field sensing elements, of a rotating target.

16. The method as claimed in claim 14, wherein the phase lead filter is defined in an analog domain by H(S)=(1S/Z0)/ (1+S/P0), wherein H(S) deines the analog domain of the phase lead filer, S is a complex function in the frequency domain, Z0 represents a zero frequency and P0 represents a pole frequency.

17. A method comprising:

(a) generating a sine signal and a cosine signal corresponding to a sensed angle of a moving target;

(b) processing the sine and cosine signals, the processed sine and cosine signals having a phase lag introduced by the processing thereof; and (c) introducing a phase lead to the processed sine and cosine signals to reduce the phase lag in the processed sine and cosine signals, wherein the (c) reduces the phase lag in the processed sine and cosine signals using a phase lead filter having a zero followed by a pole, wherein the phase lead filter is defined in an analog domain by $H(S)=(1+S/Z0)/(1+S/P0)$, and wherein the phase lead filter is defined in a digital domain by:

$$H_2(s) = \frac{1 + \dfrac{k_0(1-z^{-1})}{1+z^{-1}}}{1 + \dfrac{k_p(1-z^{-1})}{1+z^{-1}}} = \frac{\dfrac{1 + z^{-1} + k_0(1-z^{-1})}{1+z^{-1}}}{\dfrac{1 + z^{-1} + k_p(1-z^{-1})}{1+z^{-1}}} = \frac{(1+k_0)+z^{-1}(1-k_0)}{(1+k_p)+z^{-1}(1-k_p)}$$

wherein $z^{-1}$ is a unit delay, $T_S$ is a sampling time, $$k_0 = \frac{2}{z_0 T_S} \text{ and } k_p = \frac{2}{p_0 T_S},$$

$z_0$ is a zero frequency $p_0$ is a pole frequency.

* * * * *